US012187042B2

(12) United States Patent
Shimada et al.

(10) Patent No.: US 12,187,042 B2
(45) Date of Patent: Jan. 7, 2025

(54) PRINTING APPARATUS AND LIQUID STORING CONTAINER

(71) Applicant: CANON KABUSHIKI KAISHA, Tokyo (JP)

(72) Inventors: Koki Shimada, Kanagawa (JP); Nobuhiro Toki, Kanagawa (JP); Daiju Takeda, Kanagawa (JP); Fumie Kameyama, Tokyo (JP); Shota Asada, Tokyo (JP); Ken Takenaga, Kanagawa (JP); Yusuke Tanaka, Kanagawa (JP); Yuta Araki, Chiba (JP); Taiji Maruyama, Kanagawa (JP); Atsushi Matsuyama, Kanagawa (JP); Yusuke Naratani, Tokyo (JP); Kousuke Tanaka, Kanagawa (JP); Koya Iwakura, Kanagawa (JP); Hideaki Matsumura, Kanagawa (JP); Tetsu Hamano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/485,004

(22) Filed: Oct. 11, 2023

(65) Prior Publication Data

US 2024/0042769 A1 Feb. 8, 2024

Related U.S. Application Data

(63) Continuation of application No. 17/375,541, filed on Jul. 14, 2021, now Pat. No. 11,827,024.

(30) Foreign Application Priority Data

Jul. 31, 2020 (JP) ................................ 2020-130771

(51) Int. Cl.
*B41J 2/175* (2006.01)

(52) U.S. Cl.
CPC ....... *B41J 2/17513* (2013.01); *B41J 2/17523* (2013.01); *B41J 2/17553* (2013.01)

(58) Field of Classification Search
CPC ................ B41J 2/17513; B41J 2/17523; B41J 2/17553; B41J 2002/17573; B41J 2/17509;
(Continued)

(56) References Cited

U.S. PATENT DOCUMENTS

| | | | | |
|---|---|---|---|---|
| 5,793,395 | A | 8/1998 | Tanaka et al. | 347/85 |
| 6,082,851 | A | 7/2000 | Shihoh et al. | 347/85 |

(Continued)

FOREIGN PATENT DOCUMENTS

| | | |
|---|---|---|
| CN | 101925466 | 12/2010 |
| CN | 106626765 | 5/2017 |

(Continued)

OTHER PUBLICATIONS

Japanese Office Action issued on Apr. 12, 2024 in counterpart Japanese Patent Appln. No. 2020-130771.

(Continued)

*Primary Examiner* — Jason S Uhlenhake
*Assistant Examiner* — Alexander D Shenderov
(74) *Attorney, Agent, or Firm* — Venable LLP

(57) ABSTRACT

A printing apparatus includes a liquid storing container including a storage chamber configured to store a liquid supplied to a printing unit that prints an image by discharging the liquid, an outlet portion of the liquid, and a channel configured to connect the storage chamber and the outlet portion. The liquid storing container includes a first side portion on a side of a print region where printing is executed by the printing unit, and a second side portion on an opposite side of the first side portion, and the channel is formed in the second side portion.

19 Claims, 14 Drawing Sheets

(58) Field of Classification Search
CPC ........ B41J 2/17566; B41J 29/13; B41J 29/02; B41J 2/045; B41J 2/17503; B41J 2/01
USPC ............................................................ 347/86
See application file for complete search history.

(56) References Cited

U.S. PATENT DOCUMENTS

| | | | |
|---|---|---|---|
| 9,738,081 B2 | 8/2017 | Kimura et al. | B41J 2/175 |
| 10,118,396 B2 | 11/2018 | Kimura et al. | B41J 29/377 |
| 2010/0295905 A1 | 11/2010 | Tamaki | B41J 2/175 |
| 2010/0328408 A1 | 12/2010 | Akiyama et al. | 347/92 |
| 2017/0120609 A1 | 5/2017 | Kimura et al. | B41J 2/175 |
| 2017/0282572 A1 | 10/2017 | Osakabe et al. | B41J 2/17523 |
| 2017/0282573 A1 | 10/2017 | Hayashi et al. | |
| 2017/0305163 A1 | 10/2017 | Kimura et al. | B41J 2/175 |
| 2020/0101748 A1 | 4/2020 | Osakabe et al. | B41J 2/175 |
| 2020/0316973 A1 | 10/2020 | Toki et al. | B41J 2/17523 |
| 2022/0009244 A1 | 1/2022 | Matsumura et al. | B41J 2/175 |
| 2022/0016893 A1 | 1/2022 | Nagai et al. | B41J 2/175 |
| 2022/0016894 A1 | 1/2022 | Nagaoka et al. | B41J 2/175 |

FOREIGN PATENT DOCUMENTS

| | | |
|---|---|---|
| CN | 209492285 U | 10/2019 |
| CN | 209492292 U | 10/2019 |
| JP | 2017-177778 | 10/2017 |
| JP | 2017-177789 | 10/2017 |
| JP | 2021030679 A | 3/2021 |

OTHER PUBLICATIONS

Office Action dated Mar. 22, 2023 in counterpart Chinese Application No. 202110861237.9, together with English translation thereof.

Office Action dated Jul. 29, 2024 in counterpart Korean Application No. 10-2021-0095480, together with English translation thereof.

PRINTING APPARATUS AND LIQUID STORING CONTAINER

This application is a continuation of application Ser. No. 17/375,541 filed Jul. 14, 2021, currently pending; and claims priority under 35 U.S.C. § 119 to Japan Application JP 2020-130771 filed in Japan on Jul. 31, 2020; and the contents of all of which are incorporated herein by reference as if set forth in full.

BACKGROUND OF THE INVENTION

Field of the Invention

The present invention relates to a printing apparatus and a liquid storing container.

Description of the Related Art

There is known a printing apparatus including a printhead for discharging a liquid, as represented by an inkjet printer. The liquid consumed by the printhead is stored in a liquid storing container. It is designed so the liquid does not leak from the printhead due to a head difference caused by the arrangement of the liquid storing container and the printhead if the printing apparatus is in a posture at the time of use. However, the printing apparatus may be installed in a posture different from that at the time of use in accordance with a transportation or packaging state. For example, there may be a situation in which the printing apparatus is installed in a posture in which a side portion of the printing apparatus is set on the upper side when it is transported.

As a result, the liquid storing container may be located above a liquid discharge surface of the printhead. If the liquid discharge surface of the printhead is not covered with a cap and the meniscus of a nozzle is broken due to sticking of a foreign substance, the liquid may leak from the printhead by gravity. As a technique of suppressing leakage of the liquid caused by a change in posture of the printing apparatus, Japanese Patent Laid-Open No. 2017-177789 discloses a technique of reducing an amount of ink leaking by providing two storage chambers (ink chambers) for storing ink. The storage chamber is partially sealed by a flexible film.

In the arrangement of the ink tank disclosed in Japanese Patent Laid-Open No. 2017-177789, the film is located on the outer wall side of the printing apparatus. In this arrangement, in a process of manufacturing the printing apparatus, the film may be damaged when incorporating an exterior component. Furthermore, in order for the user to confirm a remaining ink amount, a window portion through which the storage chamber of the ink tank can visually be recognized from the outside is often formed on the outer wall of the printing apparatus. In the arrangement disclosed in Japanese Patent Laid-Open No. 2017-177789, the film faces the window portion and may thus be damaged due to entrance of foreign substances from the outside of the printing apparatus. Such damage may break the film.

SUMMARY OF THE INVENTION

The present invention provides a technique of suppressing leakage of a liquid when a printing apparatus is installed in a posture different from that at the time of use.

According to an aspect of the present invention, there is provided a printing apparatus comprising a liquid storing container including a storage chamber configured to store a liquid supplied to a printing unit that prints an image by discharging the liquid, an outlet portion of the liquid, and a channel configured to connect the storage chamber and the outlet portion, wherein the liquid storing container includes a first side portion on a side of a print region where printing is executed by the printing unit, and a second side portion on an opposite side of the first side portion, and the channel is formed in the second side portion.

Further features of the present invention will become apparent from the following description of exemplary embodiments (with reference to the attached drawings).

DESCRIPTION OF THE EMBODIMENTS

Figure 1:
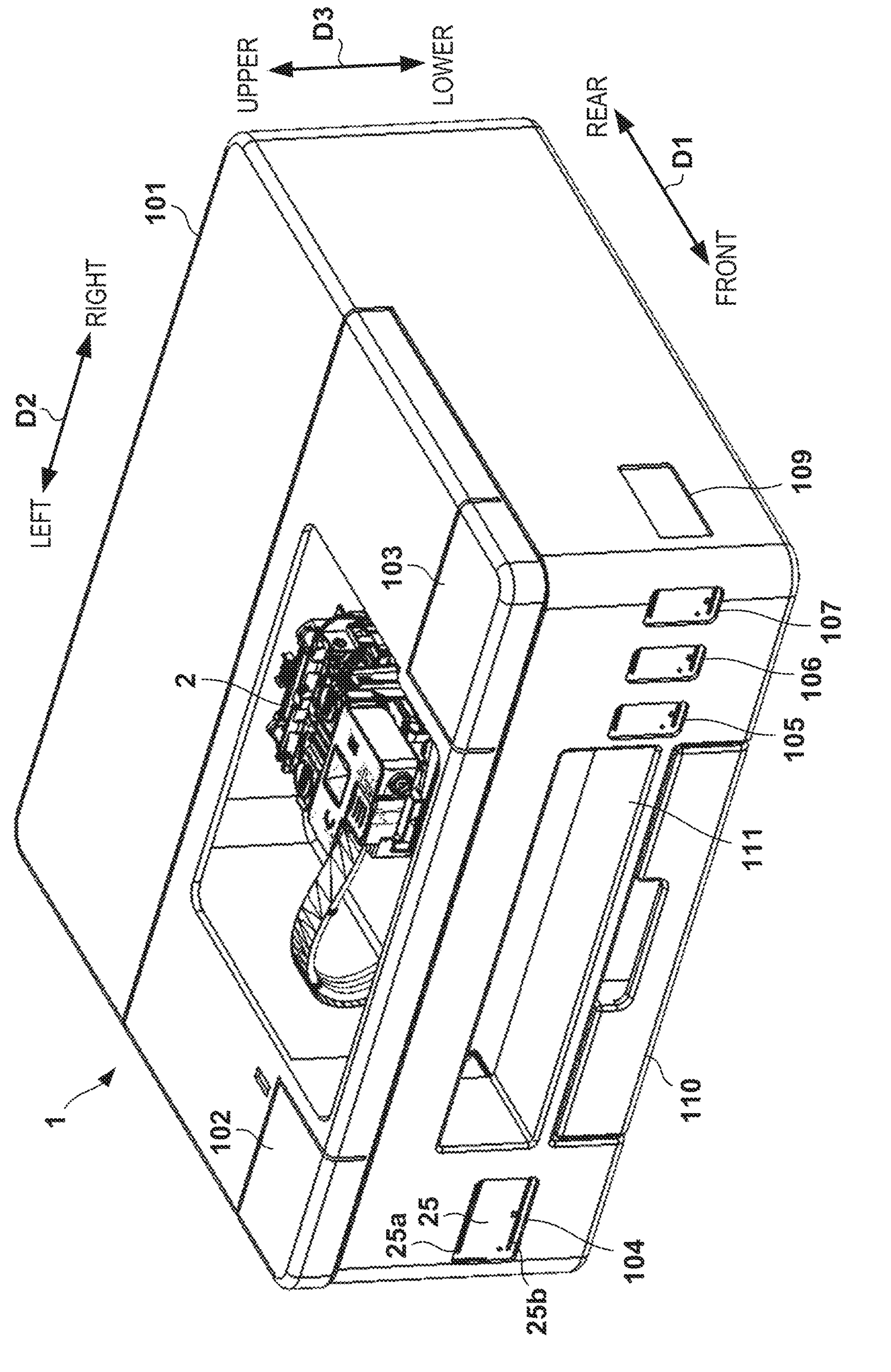
FIG. 1 is a perspective view of a printing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate.

Furthermore, in the attached drawings, the same reference numerals are given to the same or similar configurations, and redundant description thereof is omitted.

<Overview of Printing Apparatus>

Figure 2:
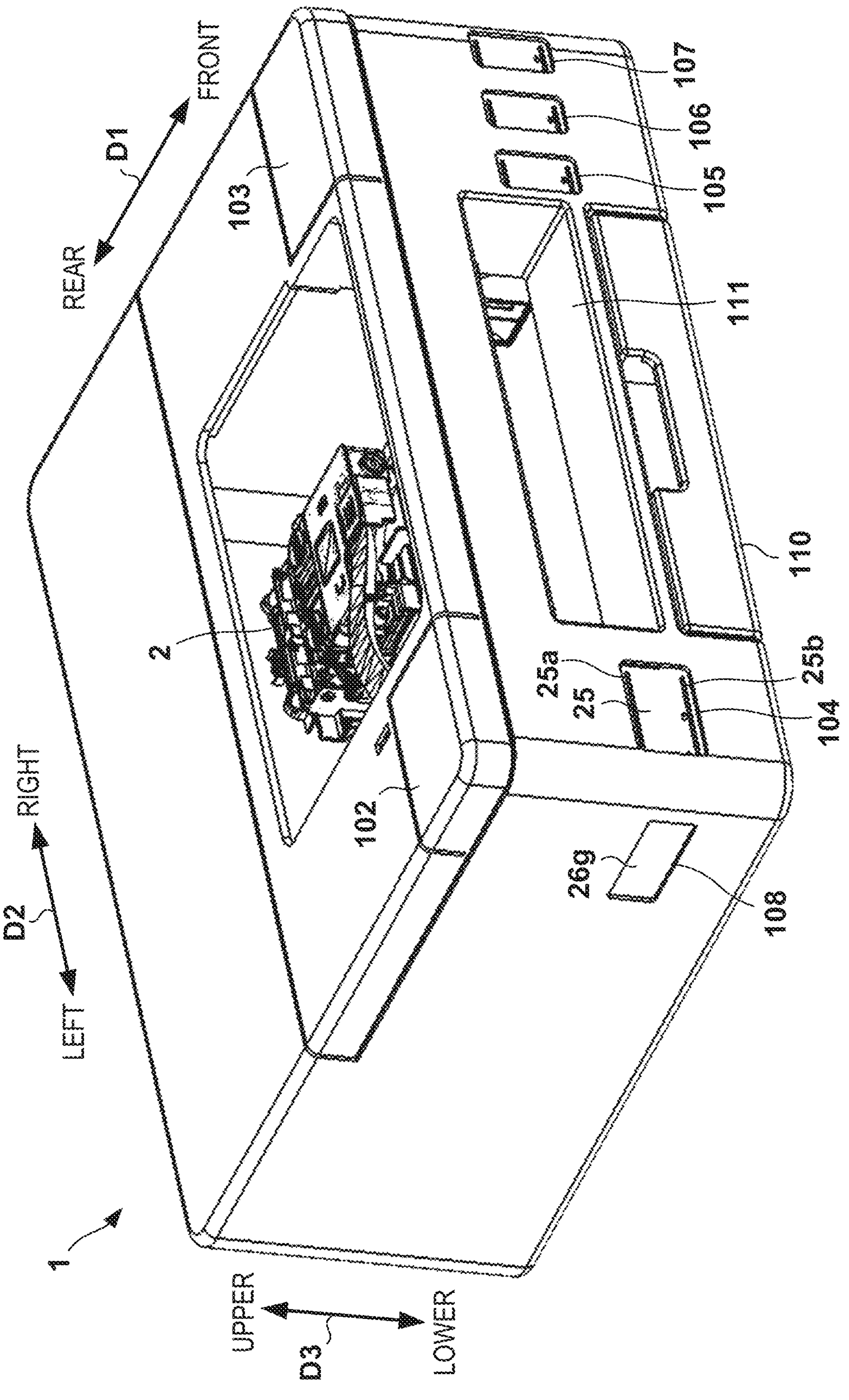
FIG. 2 is a perspective view of the printing apparatus shown in FIG. 1 when viewed from another angle.

FIGS. 1 and 2 are perspective views of a printing apparatus 1 according to an embodiment of the present invention. The printing apparatus 1 is a serial type inkjet printing apparatus in which a printhead is mounted on a carriage that reciprocally moves. However, the present invention is also applicable to another printing apparatus such as an inkjet printing apparatus including a so-called full-line printhead in which a plurality of nozzles for discharging a liquid to a region corresponding to the width of a print medium are provided. In FIGS. 1 and 2, arrows D1 and D2 indicate horizontal directions orthogonal to each other and an arrow D3 indicates a vertical direction (gravity direction). In the following description, with respect to the respective directions when the printing apparatus 1 is used, assume that the printing apparatus 1 is installed on the horizontal plane, the D1 direction is set as a depth direction, the D2 direction is set as a left-and-right direction, and the D3 direction is set as a height direction, unless otherwise specified.

Note that "printing" not only includes the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans. In addition, this embodiment assumes sheet-like paper as "the print medium", but it is also possible to use, for example, a piece of cloth or a plastic film.

The printing apparatus 1 has a flat rectangular parallelepiped shape as a whole, and includes a housing 101 forming an outer wall portion of the printing apparatus 1. In the front portion of the printing apparatus 1, a tray 110 on which a print target print medium is placed is provided to be slidable in the D1 direction. A discharge port 111 from which a printed print medium is discharged is formed above the tray 110.

A plurality of window portions 104 to 109 are formed in the housing 101. The user can visually recognize the internal arrangement of the housing 101 through the window portions 104 to 109. In this embodiment, the user can visually recognize the remaining amounts of ink stored in liquid storing containers 6 (see FIG. 3) through the window portions 104 to 109. The window portions 104 to 109 according to this embodiment are openings formed in the housing 101. The window portions 104 to 109 may be formed by transparent members instead of the openings, and each of these members may be a color transparent member or a colorless transparent member. The window portions 104 to 107 are formed in the front portion of the housing 101, in which the window portion 104 is formed in the left end portion and the window portions 105 to 107 are formed in the right end portion. The tray 110 and the discharge port 111 are located between the window portion 104 and the window portions 105 to 107. The window portion 108 is formed on the front side in the left side portion of the housing 101 and the window portion 109 is formed on the front side in the right side portion of the housing 101.

The printing apparatus 1 includes covers 102 and 103 that can be opened/closed. When each of the covers 102 and 103 is opened, it is possible to refill, with liquid ink, the liquid storing container (to be described later) arranged inside (on the lower side of) the cover. The cover 102 is located at the front left end of the upper portion of the printing apparatus 1 and the cover 103 is located at the front right end of the upper portion of the printing apparatus 1.

Figure 3:
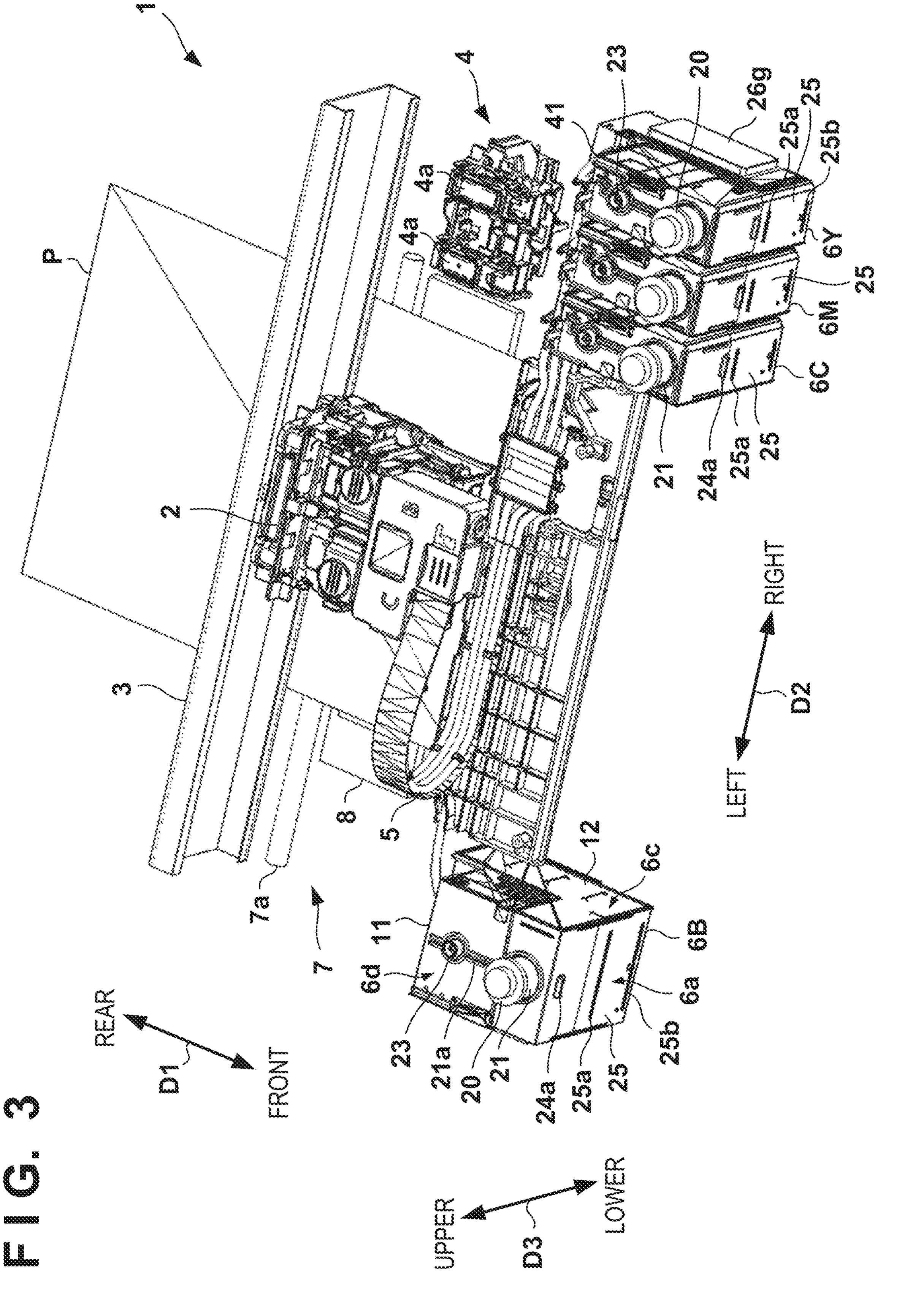
FIG. 3 is a schematic view of the internal mechanism of the printing apparatus shown in FIG. 1.
Figure 4A:
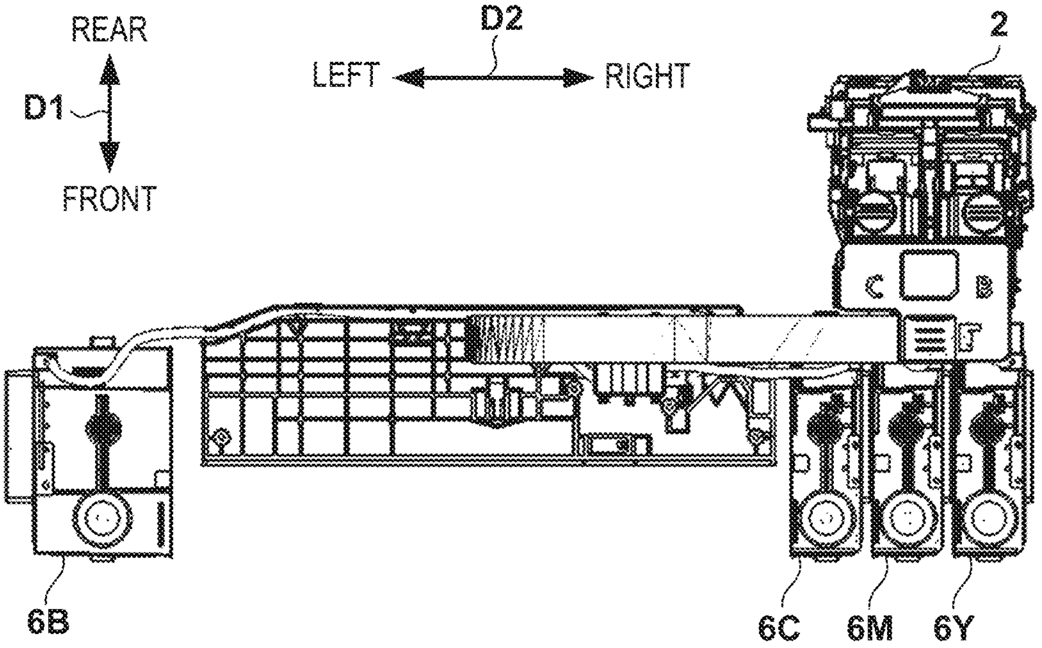
FIGS. 4A and 4B are explanatory views each showing the position of a carriage.
Figure 4B:
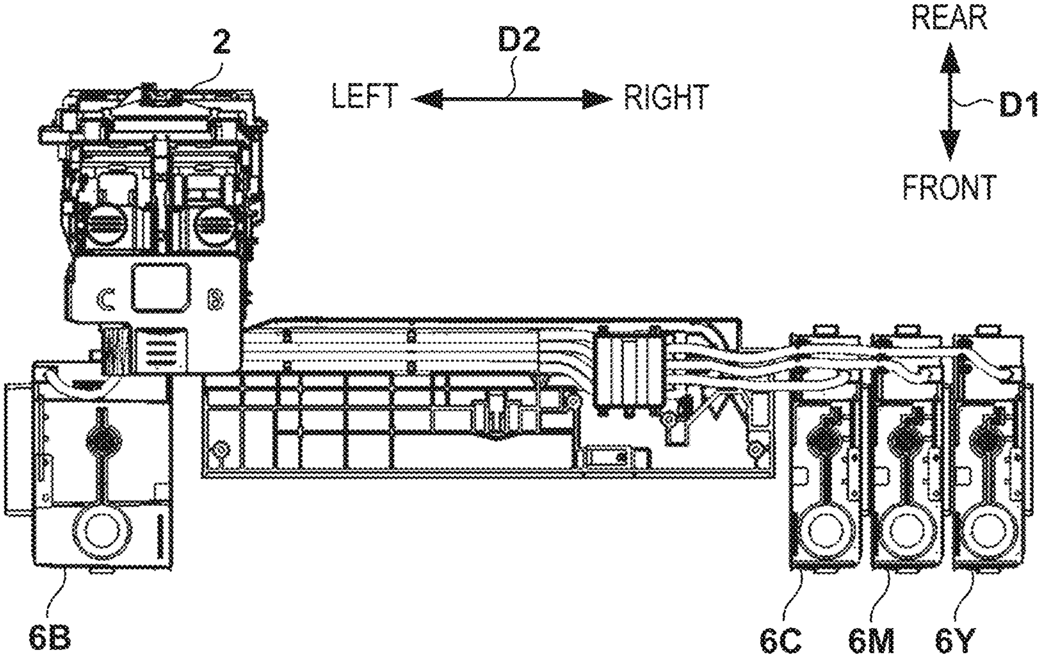
Figure 5A:
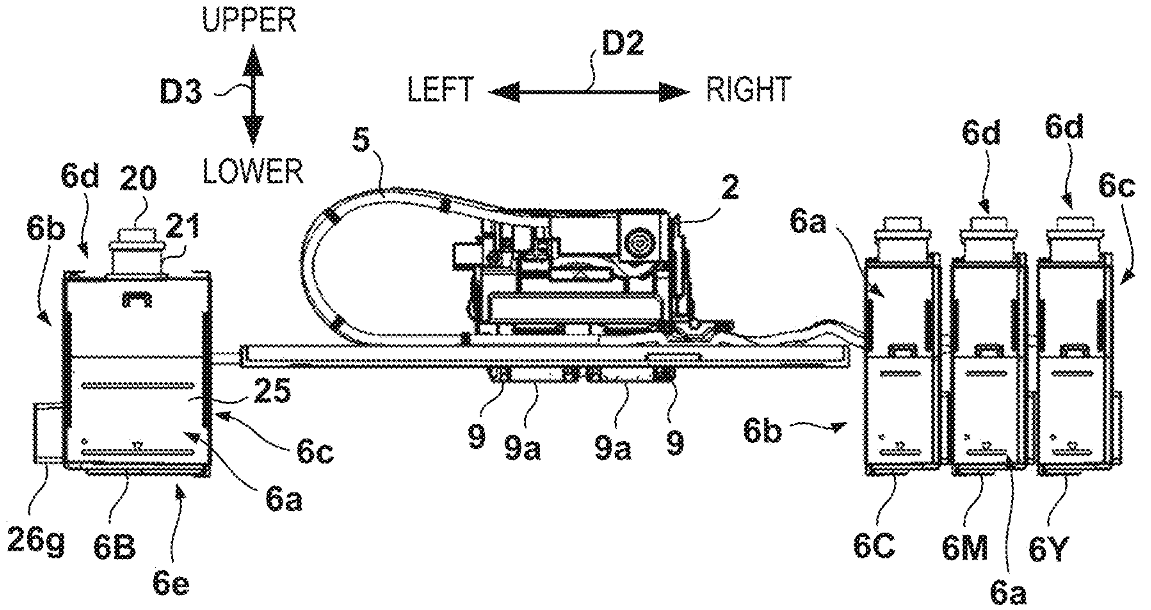
FIGS. 5A and 5B are a front view and a plan view of the carriage and liquid storing containers.
Figure 5B:
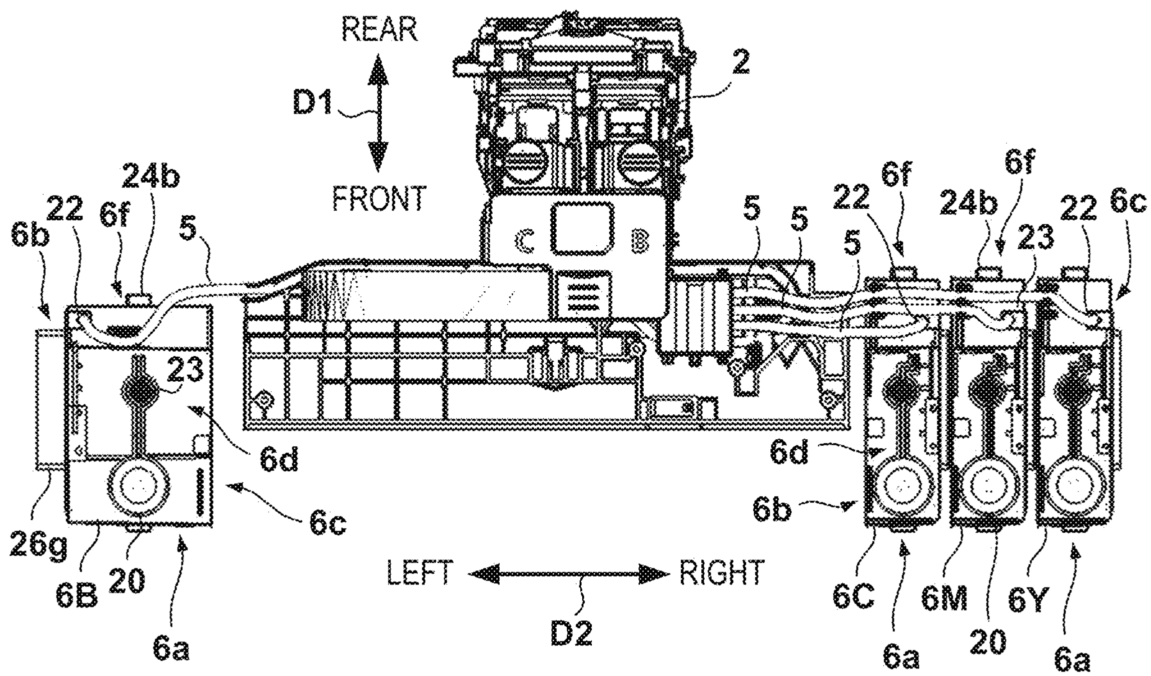

A reference is made to FIGS. 3 to 5B in addition to FIGS. 1 and 2. FIG. 3 is a schematic view of the internal mechanism of the printing apparatus 1. FIGS. 4A and 4B are explanatory views each showing the position of a carriage 2. FIGS. 5A and 5B are a front view and a plan view each showing the arrangement of the carriage 2 and a plurality of liquid storing containers 6B, 6C, 6M, and 6Y. Note that FIGS. 1 and 2 are schematic perspective views showing a state in which the upper portion is partially opened to show the internal arrangement of the housing 101.

The carriage 2 is supported by a rail 3 extended in the D2 direction, and is provided to be reciprocally movable in the D2 direction by a driving mechanism (not shown). The driving mechanism includes, for example, a belt transmission mechanism with an endless belt connected to the carriage 2, and a motor serving as a driving source for driving the belt transmission mechanism. The carriage 2 moves in the D2 direction while being mounted with printheads 9. In this embodiment, two printheads 9 corresponding to ink types are mounted on the carriage 2 (see FIG. 5A). One of the printheads 9 discharges the liquid ink stored in the liquid storing container 6B, and the other printhead 9 discharges the liquid ink stored in each of the liquid storing containers 6C, 6M, and 6Y. Each printhead 9 includes an ink discharge surface 9*a* on which a plurality of nozzles for discharging ink are formed, and the ink discharge surface 9*a* faces a platen 8 that supports a print medium P. By discharging ink from the printhead 9 to the print medium Pin a process of moving the carriage 2, an image is printed. This operation will be referred to as print scanning hereinafter. The moving range on the platen 8 of the ink discharge surface 9*a* along with the moving range of the carriage 2 corresponds to a print region where printing is executed.

A conveying unit 7 is a mechanism for conveying the print medium P. The conveying unit 7 includes a conveying roller 7*a*. A pinch roller (not shown) is pressed against the conveying roller 7*a* and the print medium P is conveyed to the front side in the D1 direction by rotation of the conveying roller 7*a* while the nip portion nips the print medium P. The conveying unit 7 intermittently conveys the print medium P to pass through a portion between the platen 8 and the ink discharge surface 9*a*. By alternately repeating the conveyance operation of the print medium P by the conveying unit 7 and print scanning, an image of each page can be printed on the print medium P.

A recovery unit 4 is provided at one end of the moving range of the carriage 2. The recovery unit 4 is a mechanism for maintaining the ink discharge performance of each printhead 9. The recovery unit 4 includes caps 4*a* that cover the printheads 9. The cap 4*a* is provided for each printhead 9, and caps the ink discharge surface 9*a* to prevent drying of the nozzles. In addition, the recovery unit 4 can perform, for example, a recovery operation of sucking ink from the printhead 9 by setting a negative pressure in the cap 4*a*. FIG. 4A shows a state in which the carriage 2 is located at the right end (home position) of the moving range. The carriage 2 is located above the recovery unit 4, and capping of the ink discharge surface 9*a* by the cap 4*a* and the recovery operation of the printhead 9 can be possible at this position. FIG. 4B shows a state in which the carriage 2 is located at the left end of the moving range. At this position, the carriage 2 is not located above the recovery unit 4 and thus capping of the ink discharge surface 9*a* is impossible.

Each of the liquid storing containers 6B, 6C, 6M, and 6Y is an ink tank that stores liquid ink to be discharged by the printhead 9. In the following description, the liquid storing containers 6B, 6C, 6M, and 6Y will be represented as the liquid storing containers 6 when they are generally referred to or they are not distinguished from each other. In this embodiment, the liquid storing container 6 is a stationary container fixed to the printing apparatus 1. If the remaining ink amount decreases, the user refills the liquid storing container 6 with ink without detaching the liquid storing container 6 from the printing apparatus 1.

Each liquid storing container 6 stores ink of a different type. In this embodiment, the liquid storing containers 6B, 6C, 6M, and 6Y store black ink, cyan ink, magenta ink, and yellow ink, respectively. Note that the number of types of liquid ink discharged by the printheads 9 is not limited to four as in this embodiment, and one or a plurality of types other than four may be possible. The number of liquid storing containers need only be equal to or more than the number of types of liquid ink.

The liquid storing containers 6C, 6M, and 6Y are containers of the same structure, and the liquid storing container 6B is a container having a capacity larger than those of the liquid storing containers 6C, 6M, and 6Y. Therefore, the liquid storing container 6B is a container wider in width in the D2 direction than the liquid storing containers 6C, 6M, and 6Y. The liquid storing container 6B is arranged at the left end in the front portion of the printing apparatus 1. The liquid storing container 6B is made of a transparent material, and the user can visually recognize the remaining amount of the stored ink through the window portions 104 and 108. When performing ink refill, the user opens the cover 102. This exposes the upper portion of the liquid storing container 6B, thereby making it possible to perform ink refill.

The liquid storing containers 6C to 6Y are arranged side by side in the D2 direction at the right end in the front portion of the printing apparatus 1. The printhead 9 (or the print region where printing is executed by the printhead 9) is located between the liquid storing container 6B and the liquid storing containers 6C to 6Y. The liquid storing containers 6C to 6Y are also made of a transparent material. The user can visually recognize the remaining amount of the ink stored in the liquid storing container 6C through the window portion 105, the remaining amount of the ink stored in the liquid storing container 6M through the window portion 106, and the remaining amount of the ink stored in the liquid storing container 6Y through the window portions 107 and 109. When refilling each of the liquid storing containers 6C to 6Y with ink, the user opens the cover 103. This exposes the upper portions of the liquid storing containers 6C to 6Y, thereby making it possible to perform ink refill.

Each of the liquid storing containers 6B, 6C, 6M, and 6Y is connected to the printhead 9 via an individual tube 5, and the ink is supplied to the printhead 9 via the tube 5. The tube 5 is flexible, and can stably supply the ink to the printhead 9 regardless of the movement and position of the carriage 2.

<Structures of Liquid Storing Containers>

<Structure of Liquid Storing Container 6B>

Figure 6A:
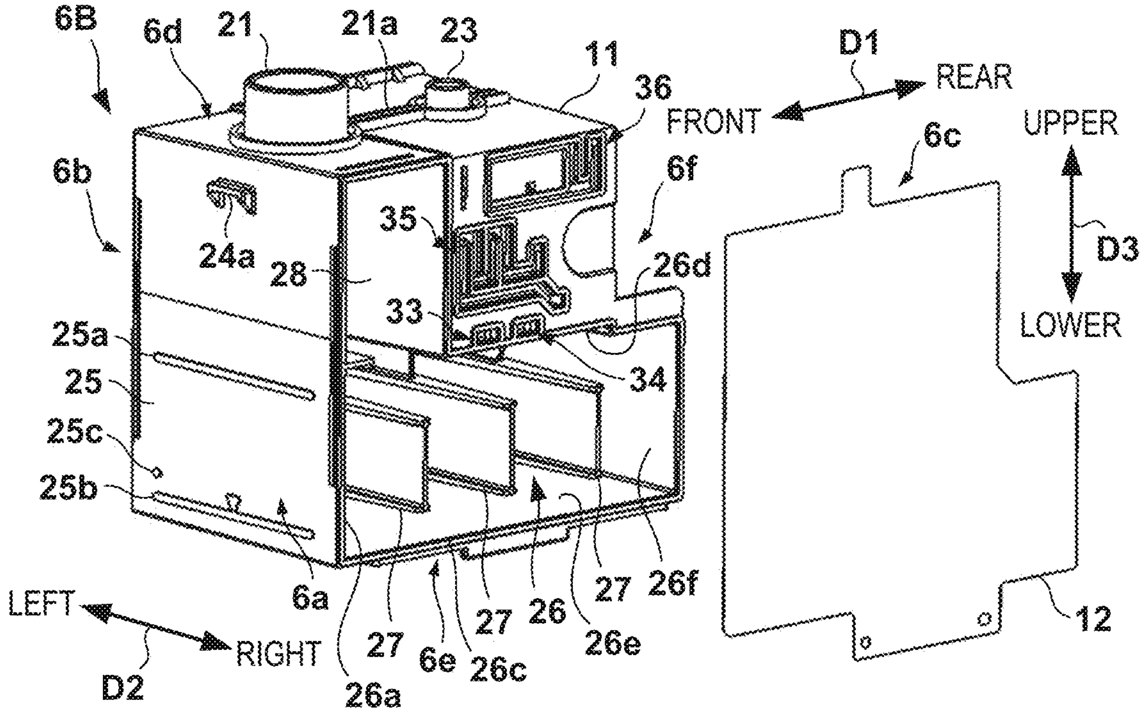
FIGS. 6A and 6B are exploded perspective views of the liquid storing container.
Figure 6B:
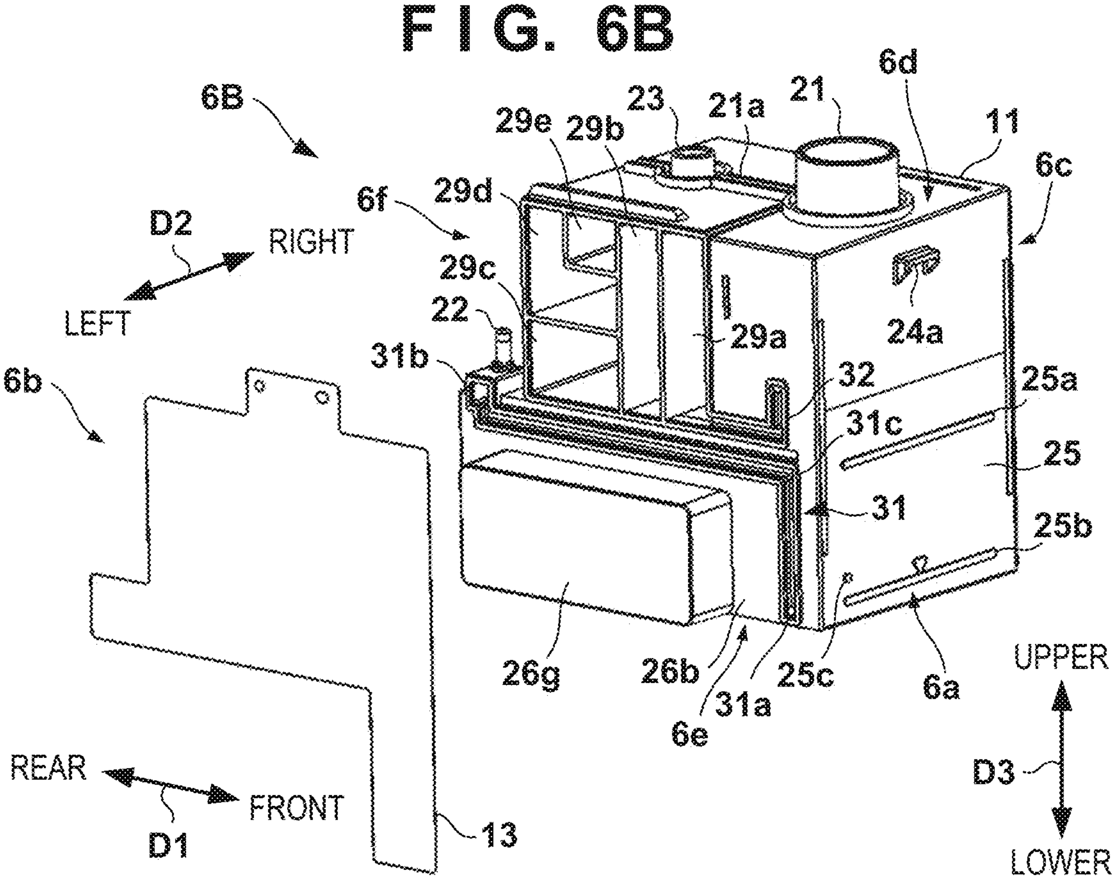

The structure of the liquid storing container 6B will be described with reference to FIGS. 6A and 6B in addition to FIGS. 5A and 5B. FIGS. 6A and 6B are exploded perspective views of the liquid storing container 6B.

The liquid storing container 6B has a rectangular parallelepiped outer shape as a whole, and includes a front side portion 6*a*, a left side portion 6*b*, a right side portion 6*c*, a top portion 6*d*, a bottom portion 6*e*, and a rear side portion 6*f* The front side portion 6*a* and the rear side portion 6*f* are side portions opposing each other, and the left side portion 6*b* and the right side portion 6*c* are side portions opposing each other. When comparing the positions of the left side portion 6*b* and the right side portion 6*c*, the right side portion 6*c* is a side portion inside the apparatus on the side of the printhead 9, and the left side portion 6*b* is a side portion on the outer side of the apparatus on the opposite side. That is, the right side portion 6*c* is a side portion on the side of the print region where printing is executed by the printhead 9. The rear side portion 6*f* is provided with a step in a midway portion in the D3 direction, and the width of the liquid storing container 6B in the D1 direction is short on the side of the top portion 6*d* and is long on the side of the bottom portion 6*e*.

The liquid storing container 6B includes a main body 11 and sealing members 12 and 13 fixed to the main body 11. The sealing members 12 and 13 according to this embodiment are flexible films and are fixed to the main body 11 by bonding or welding. The sealing member 12 is arranged in the right side portion 6*c* of the liquid storing container 6B, and covers and seals the openings and grooves of the right side portion of the main body 11. The sealing member 13 is arranged in the left side portion 6*b* of the liquid storing container 6B, and seals the openings and grooves of the left side portion of the main body 11. The main body 11 is a hollow structure made of a resin, and is a forming member that forms each component to be described below. All of the main body 11 and the sealing members 12 and 13 are transparent members, and it is thus possible to visually recognize the interior of the liquid storing container 6B from the outside. Each of these members may be a color transparent member or a colorless transparent member.

The liquid storing container 6B includes a cylindrical injection portion 21 formed in the top portion 6*d* by the main body 11. When the cover 102 is opened, the injection portion 21 is exposed. When performing ink refill, ink is injected from the injection portion 21. A detachable lid 20 is attached to the injection portion 21. A groove 21*a* is formed around the injection portion 21 in the top portion 6*d* of the main body 11. The groove 21*a* receives ink dropping outside the injection portion 21 at the time of ink refill.

The liquid storing container 6B includes a cylindrical outlet portion 22 formed in the step portion of the rear side portion 6*f* by the main body 11. The outlet portion 22 is an outlet of the ink stored in the liquid storing container 6B, and is a liquid outlet for making the ink flow to the printhead 9. The tube 5 is connected to the outlet portion 22 and the ink stored in the liquid storing container 6B is supplied from the outlet portion 22 to the printhead 9 via the tube 5.

The liquid storing container 6B includes a cylindrical air communicating portion 23 formed in the top portion 6*d* by the main body 11. The air communicating portion 23 is a communication port that is used to make the interior of the liquid storing container 6B communicate with air and perform gas-liquid exchange along with flow-out of the stored ink.

The liquid storing container 6B includes an ink visible surface 25 formed in the front side portion 6*a* by the main body 11. The ink visible surface 25 is a transparent surface through which the user visually recognizes, from the outside (the window portions 104 and 108), the remaining amount of ink stored in a storage chamber 26 behind the ink visible surface 25. On the ink visible surface 25, a lower limit display portion 25*b* that indicates a guideline for the lower limit of the remaining amount, which gives an ink refill timing, an upper limit display portion 25*a* that indicates a guideline for the upper limit when performing ink refill, and a display portion 25*c* that indicates a guideline for the remaining mount at which the recovery unit 4 can perform a recovery operation. Each of these display portions 25*a* to 25*c* is formed by the shape (formation of a concave or convex portion or the like) of the main body 11 or printing of a diagram.

The liquid storing container 6B includes an engaging portion 24*a* formed in the front side portion 6*a* by the main body 11 and an engaging portion 24*b* formed in the rear side portion 6*f* by the main body 11. The engaging portions 24*a* and 24*b* are engaged with engaging portions (not shown) formed in the housing 101, thereby fixing and positioning the liquid storing container 6B.

The liquid storing container 6B includes the storage chamber 26 storing ink on the side of the bottom portion 6*e*, and includes buffer chambers 29*a* to 29*e* on the side of the top portion 6*d*. The storage chamber 26 communicates with the air communicating portion 23 via the buffer chambers 29*a* to 29*e*. The buffer chambers 29*a* to 29*e* prevent the ink from flowing from the storage chamber 26 to the air communicating portion 23 to leak outside the liquid storing container 6B.

The storage chamber 26 is defined by the main body 11 and the sealing member 12. The main body 11 includes, as components forming the storage chamber 26, peripheral wall portions 26*a*, 26*b*, and 26*d* to 26*f* with an opening 26*c*, and the opening 26*c* is sealed by the sealing member 12 to form the liquid-tight storage chamber 26. The peripheral wall portions 26*a*, 26*b*, and 26*d* to 26*f* respectively form the front wall portion, left wall portion, upper wall portion, bottom wall portion, and rear wall portion of the storage chamber 26. The opening 26*c* opens to the right side portion of the main body 11, and the sealing member 12 forms the right wall portion of the storage chamber 26.

The peripheral wall portion (upper wall portion) 26*d* divides the storage chamber 26 and the buffer chambers 29*a* to 29*e* as spaces above the storage chamber 26. The peripheral wall portion (upper wall portion) 26*d* communicates with an injection path 28 as a space above the peripheral wall portion 26*d* in a communicating portion 26*d*' (see FIG. 7B), and the injection path 28 communicates with the injection portion 21. The injection path 28 is defined by the main body 11 and the sealing member 12. Ink injected from the injection portion 21 flows into the storage chamber 26 via the injection path 28, and is stored. The peripheral wall portion (left wall portion) 26*b* includes a protruding portion 26*g* forming the lower portion of the left side portion 6*b* of the liquid storing container 6B and protruding outward (leftward). The protruding portion 26*g* protrudes to the window portion 108. The user can visually recognize, from the outside of the printing apparatus 1, the remaining ink amount of the storage chamber 26 via the protruding portion 26*g* having transparency. By forming the protruding portion 26*g*, it is possible to extend the ink storing space of the storage chamber 26.

In the storage chamber 26, a plurality of ribs 27 formed by the main body 11 are arranged. The ribs 27 are extended from the peripheral wall portion (left wall portion) 26*b* to a position close to the opening 26*c*, and support the sealing member 12 from its inside, thereby reducing occurrence of unevenness of the sealing member 12.

If a maximum amount of ink is stored in the storage chamber 26, the liquid surface almost coincides with the position of the upper limit display portion 25*a*. The outlet portion 22 is located at a position higher than the upper limit display portion 25*a*. Therefore, if a maximum amount of ink is stored in the storage chamber 26, the outlet portion 22 is located above the liquid surface of the ink, and the ink never leaks from the outlet portion 22.

The buffer chambers 29*a* to 29*e* are defined by the main body 11 and the sealing member 13. The main body 11 includes peripheral wall portions opening to the left side portion, which individually form the buffer chambers 29*a* to 29*e*. When the opening is sealed by the sealing member 13, the buffer chambers 29*a* to 29*e* are formed.

Figure 7B:
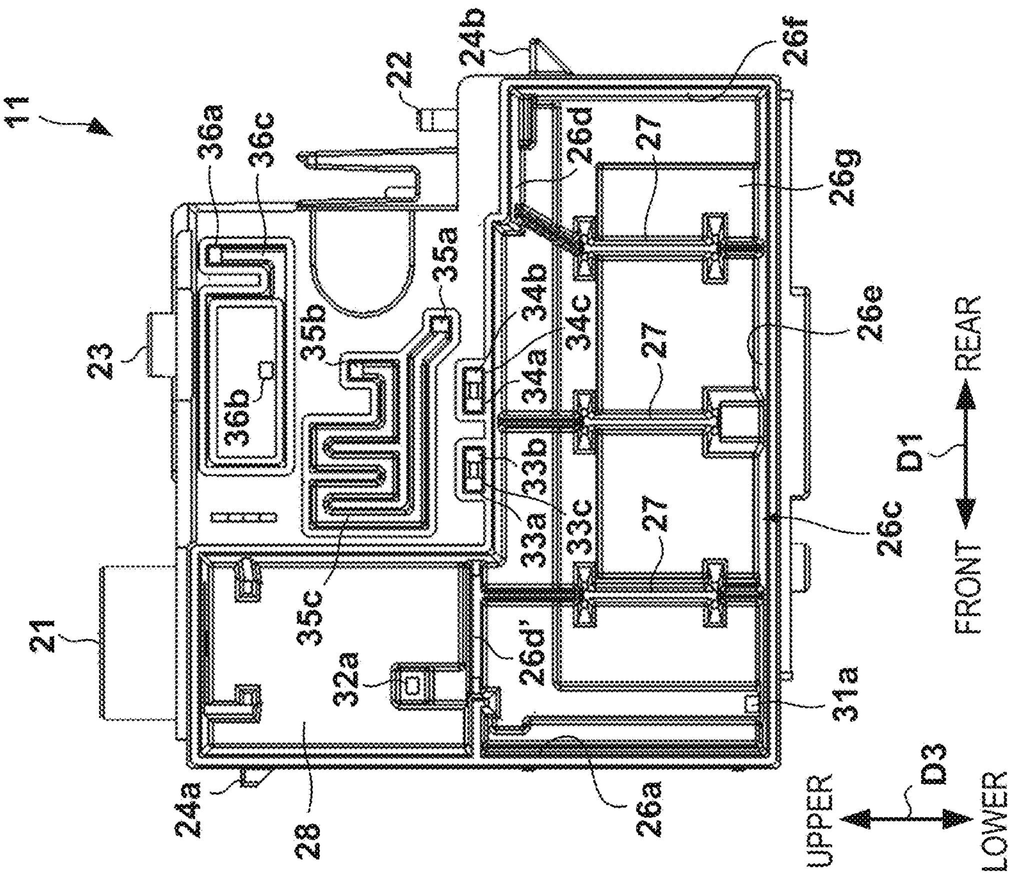
FIGS. 7A and 7B are a right side view and a left side view of the main body of the liquid storing container.
Figure 7A:
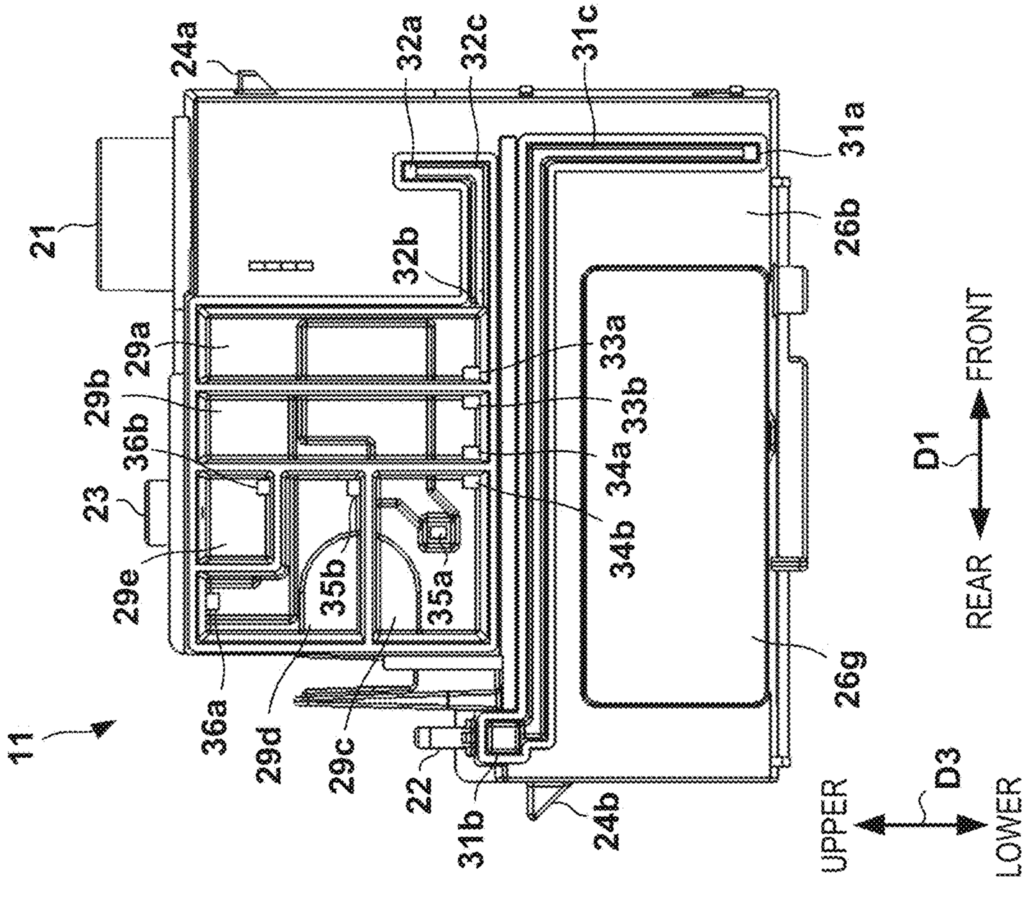

Channels provided in the liquid storing container 6B will be described with reference to FIGS. 7A and 7B in addition to FIGS. 6A and 6B.

A channel 31 is a channel that makes the storage chamber 26 and the outlet portion 22 communicate with each other. The channel 31 is formed in the left side portion 6*b* of the liquid storing container 6B. More specifically, the channel 31 is defined by a groove 31*c* formed in the peripheral wall portion (left wall portion 26*b*) of the main body 11 and the sealing member 13 that seals the groove 31*c*. The channel 31 includes a portion extended in the D3 direction and a portion extended in the D1 direction, and thus has an L shape as a whole. One end 31*a* of the channel 31 is an end on the side of the storage chamber 26, and penetrates the lower portion in the front portion of the peripheral wall portion (left wall portion 26*b*) to open to the storage chamber 26. The other end 31*b* of the channel 31 is an end on the side of the outlet portion 22, and communicates with the outlet portion 22.

A channel 32 is a channel that makes the injection path 28 and the buffer chamber 29*a* communicate with each other. The channel 32 is formed in the left side portion 6*b* of the liquid storing container 6B. More specifically, the channel 32 is defined by a groove 32*c* formed in the main body 11 and the sealing member 13 that seals the groove 32*c*. One end 32*a* of the channel 32 is an end on the side of the injection path 28, and opens to the injection path 28. The end 32*a* is formed in a protruding portion that protrudes from the left wall portion of the injection path 28 to the right side. The other end 32*b* of the channel 32 is an end on the side of the buffer chamber 29*a*, and opens to the buffer chamber 29*a*.

A channel 33 is a channel that makes the buffer chambers 29*a* and 29*b* communicate with each other. The channel 33 is formed in the right side portion 6*c* of the liquid storing container 6B. More specifically, the channel 33 is defined by a groove 33*c* formed in the main body 11 and the sealing member 12 that seals the groove 33*c*. One end 33*a* of the channel 33 is an end on the side of the buffer chamber 29*a*, and opens to the buffer chamber 29*a*. The other end 33*b* of the channel 33 is an end on the side of the buffer chamber 29*b*, and opens to the buffer chamber 29*b*.

A channel 34 is a channel that makes the buffer chambers 29*b* and 29*c* communicate with each other. The channel 34 is formed in the right side portion 6*c* of the liquid storing container 6B. More specifically, the channel 34 is defined by a groove 34*c* formed in the main body 11 and the sealing member 12 that seals the groove 34*c*. One end 34*a* of the channel 34 is an end on the side of the buffer chamber 29*b*, and opens to the buffer chamber 29*b*. The other end 34*b* of the channel 34 is an end on the side of the buffer chamber 29*c*, and opens to the buffer chamber 29*c*.

A channel 35 is a channel that makes the buffer chambers 29*c* and 29*d* communicate with each other. The channel 35 is bent and formed in the right side portion 6*c* of the liquid storing container 6B. More specifically, the channel 35 is defined by a groove 35*c* formed in the main body 11 and the sealing member 12 that seals the groove 35*c*. One end 35*a* of the channel 35 is an end on the side of the buffer chamber 29*c*, and opens to the buffer chamber 29*c*. The end 35*a* is formed in a protruding portion that protrudes from the right wall portion of the buffer chamber 29*c* to the left side. The other end 35*b* of the channel 35 is an end on the side of the buffer chamber 29*d*, and opens to the buffer chamber 29*d*.

A channel 36 is a channel that makes the buffer chambers 29*d* and 29*e* communicate with each other. The channel 36 is formed in the right side portion 6*c* of the liquid storing container 6B. More specifically, the channel 36 is defined by a groove 36*c* formed in the main body 11 and the sealing member 12 that seals the groove 36*c*. One end 36*a* of the channel 36 is an end on the side of the buffer chamber 29*d*, and opens to the buffer chamber 29*d*. The other end 36*b* of the channel 36 is an end on the side of the buffer chamber 29*e*, and opens to the buffer chamber 29*e*. The buffer chamber 29*e* communicates with the air communicating portion 23.

Note that a gas-liquid separation film may be provided in each of the channels 32 to 36 that make the storage chamber 26 and the air communicating portion 23 communicate with each other. This can reduce leakage of the ink from the air communicating portion 23 to the outside when the ink flows from the storage chamber 26 to the air communicating portion 23.

<Structure of Liquid Storing Container 6Y>

Figure 8A:
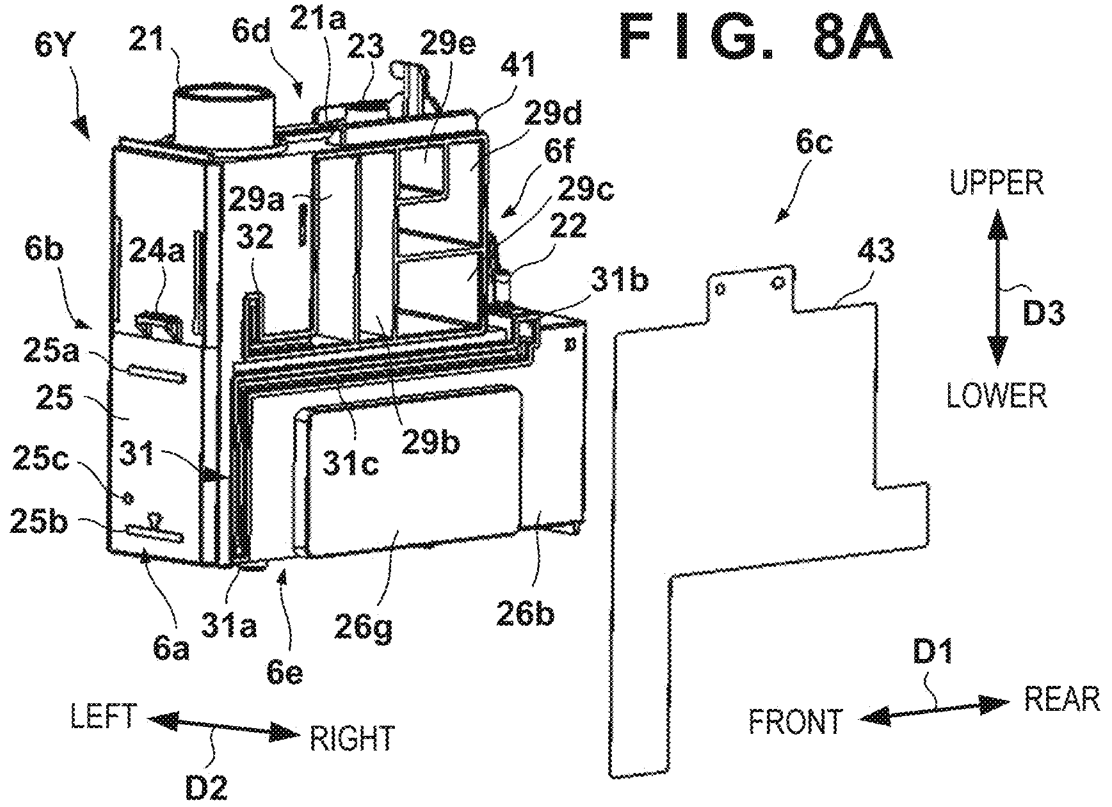
FIGS. 8A and 8B are exploded perspective views of the liquid storing container.
Figure 8B:
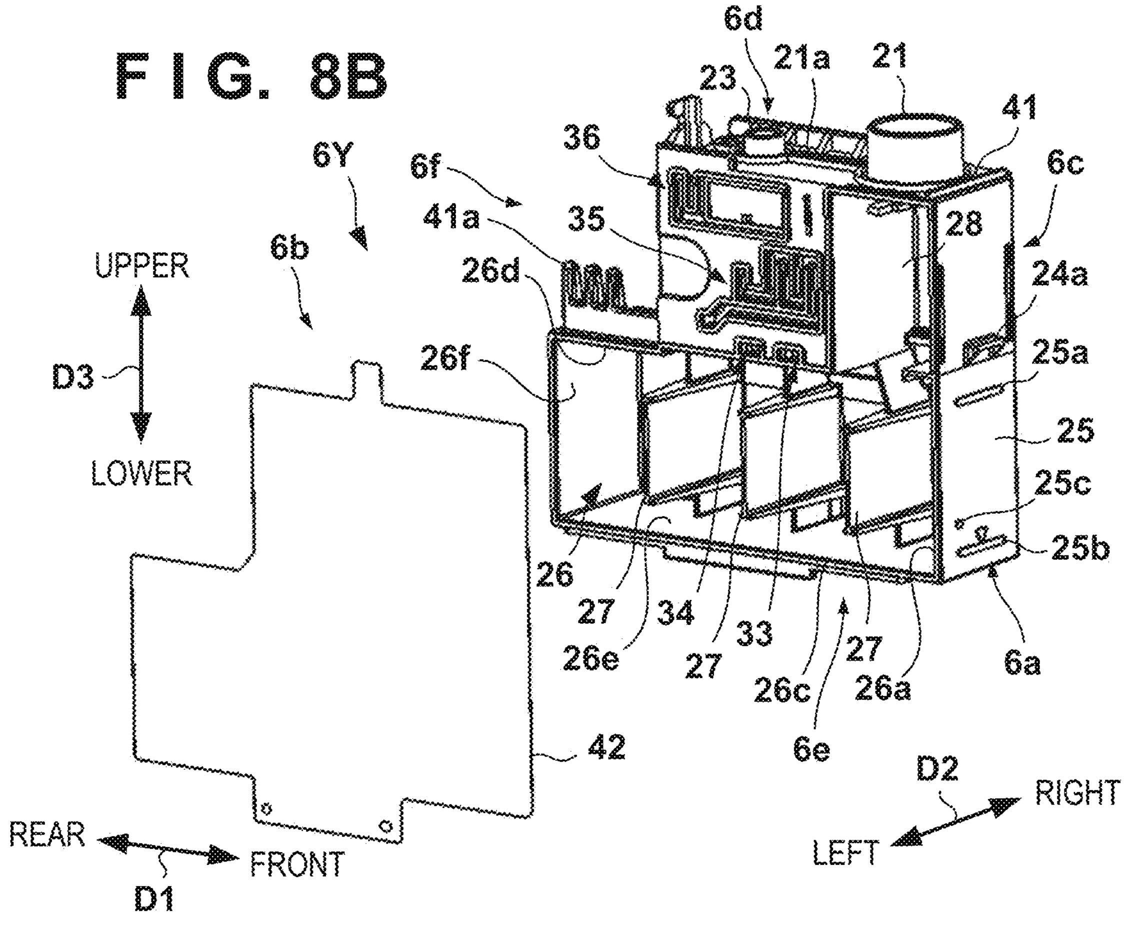

The structure of the liquid storing container 6Y will be described with reference to FIGS. 8A and 8B in addition to FIGS. 5A and 5B. FIGS. 8A and 8B are exploded perspective views of the liquid storing container 6Y. Note that the liquid storing containers 6C and 6M have the same structure as that of the liquid storing container 6Y and a description thereof will be omitted.

The liquid storing container 6Y basically has the same structure as that of the liquid storing container 6B except that the width in the left-and-right direction is narrower, the right and left arrangements are switched, and a support portion 41*a* is provided. Therefore, among the components of the liquid storing container 6Y, the same components as those of the liquid storing container 6B are denoted by the same reference numerals in each drawing. Note that the support portion 41*a* is a portion that supports a harness (not shown).

The liquid storing container 6Y has a rectangular parallelepiped outer shape as a whole, and includes a front side portion 6*a*, a left side portion 6*b*, a right side portion 6*c*, a top portion 6*d*, a bottom portion 6*e*, and a rear side portion 6*f* The front side portion 6*a* and the rear side portion 6*f* are side portions opposing each other, and the left side portion 6*b* and the right side portion 6*c* are side portions opposing each other. When comparing the positions of the left side portion 6*b* and the right side portion 6*c*, the left side portion 6*b* is a side portion inside the apparatus on the side of the printhead 9, and the right side portion 6*c* is a side portion on the outer side of the apparatus on the opposite side. That is, the left side portion 6*b* is a side portion on the side of the print region where printing is executed by the printhead 9. The rear side portion 6*f* is provided with a step in a midway portion in the D3 direction, and the width of the liquid storing container 6Y in the D1 direction is short on the side of the top portion 6*d* and is long on the side of the bottom portion 6*e*.

The liquid storing container 6Y includes a main body 41 corresponding to the main body 11 of the liquid storing container 6B, a sealing member 43 fixed to the main body 41 and corresponding to the sealing member 12 of the liquid storing container 6B, and a sealing member 42 fixed to the main body 41 and corresponding to the sealing member 13 of the liquid storing container 6B.

The sealing members 42 and 43 according to this embodiment are flexible films and are fixed to the main body 41 by bonding or welding. The sealing member 43 is arranged in the right side portion 6*c* of the liquid storing container 6Y, and covers and seals the openings and grooves of the right side portion of the main body 41. The sealing member 42 is arranged in the left side portion 6*b* of the liquid storing container 6Y, and seals the openings and grooves of the left side portion of the main body 41. The main body 41 is a hollow structure made of a resin, and is a forming member that forms each component to be described below. All of the main body 41 and the sealing members 42 and 43 are transparent members, and it is thus possible to visually recognize the interior of the liquid storing container 6Y from the outside. Each of these members may be a color transparent member or a colorless transparent member.

The liquid storing container 6Y includes a cylindrical injection portion 21 formed in the top portion 6*d* by the main body 41. When the cover 103 is opened, the injection portion 21 is exposed. When performing ink refill, ink is injected from the injection portion 21. A detachable lid 20 is attached to the injection portion 21. A groove 21*a* is formed around the injection portion 21 in the top portion 6*d* of the main body 41. The groove 21*a* receives ink dropping outside the injection portion 21 at the time of ink refill.

The liquid storing container 6Y includes a cylindrical outlet portion 22 formed in the step portion of the rear side portion 6*f* by the main body 41. The outlet portion 22 is an outlet of the ink stored in the liquid storing container 6Y, and is a liquid outlet for making the ink flow to the printhead 9. The tube 5 is connected to the outlet portion 22 and the ink stored in the liquid storing container 6Y is supplied from the outlet portion 22 to the printhead 9 via the tube 5.

The liquid storing container 6Y includes a cylindrical air communicating portion 23 formed in the top portion 6*d* by the main body 41. The air communicating portion 23 is a communication port that is used to make the interior of the liquid storing container 6Y communicate with air and perform gas-liquid exchange along with flow-out of the stored ink.

The liquid storing container 6Y includes an ink visible surface 25 formed in the front side portion 6*a* by the main body 41. The ink visible surface 25 is a transparent surface through which the user visually recognizes, from the outside (the window portions 107 and 109), the remaining amount of the ink stored in a storage chamber 26 behind the ink visible surface 25. On the ink visible surface 25, a lower limit display portion 25*b* that indicates a guideline for the lower limit of the remaining amount, which gives an ink refill timing, an upper limit display portion 25*a* that indicates a guideline for the upper limit when performing ink refill, and a display portion 25*c* that indicates a guideline for the remaining mount at which the recovery unit 4 can perform a recovery operation. Each of these display portions 25*a* to 25*c* is formed by the shape (formation of a concave or convex portion or the like) of the main body 41 or printing of a diagram.

The liquid storing container 6Y includes an engaging portion 24*a* formed in the front side portion 6*a* by the main body 41 and an engaging portion 24*b* formed in the rear side portion 6*f* by the main body 41. The engaging portions 24*a* and 24*b* are engaged with engaging portions (not shown) formed in the housing 101, thereby fixing and positioning the liquid storing container 6Y.

The liquid storing container 6Y includes the storage chamber 26 storing ink on the side of the bottom portion 6*e*, and includes buffer chambers 29*a* to 29*e* on the side of the top portion 6*d*. The storage chamber 26 communicates with the air communicating portion 23 via the buffer chambers 29*a* to 29*e*. The buffer chambers 29*a* to 29*e* prevent the ink from flowing from the storage chamber 26 to the air communicating portion 23 to leak outside the liquid storing container 6Y.

The storage chamber 26 is defined by the main body 41 and the sealing member 42. The main body 41 includes, as components forming the storage chamber 26, peripheral wall portions 26*a*, 26*b*, and 26*d* to 26*f* with an opening 26*c*, and the opening 26*c* is sealed by the sealing member 42 to form the liquid-tight storage chamber 26. The peripheral wall portions 26*a*, 26*b*, and 26*d* to 26*f* respectively form the front wall portion, right wall portion, upper wall portion, bottom wall portion, and rear wall portion of the storage chamber 26. The opening 26*c* opens to the left side portion of the main body 41, and the sealing member 42 forms the left wall portion of the storage chamber 26.

The peripheral wall portion (upper wall portion) 26*d* divides the storage chamber 26 and the buffer chambers 29*a* to 29*e* as spaces above the storage chamber 26. The peripheral wall portion (upper wall portion) 26*d* communicates with an injection path 28 as a space above the peripheral wall portion 26*d* in a communicating portion 26*d*' (see FIG. 9B), and the injection path 28 communicates with the injection portion 21. The injection path 28 is defined by the main body 41 and the sealing member 42. Ink injected from the injection portion 21 flows into the storage chamber 26 via the injection path 28, and is stored. The peripheral wall portion (right wall portion) 26*b* includes a protruding portion 26*g* forming the lower portion of the right side portion 6*c* of the liquid storing container 6Y and protruding outward (rightward). The protruding portion 26*g* protrudes to the window portion 109. The user can visually recognize, from the outside of the printing apparatus 1, the remaining ink amount of the storage chamber 26 via the protruding portion 26*g* having transparency. By forming the protruding portion 26*g*, it is possible to extend the ink storing space of the storage chamber 26.

In the storage chamber 26, a plurality of ribs 27 formed by the main body 41 are arranged. The ribs 27 are extended from the peripheral wall portion (right wall portion) 26*b* to a position close to the opening 26*c*, and support the sealing member 42 from its inside, thereby reducing occurrence of unevenness of the sealing member 42.

If a maximum amount of ink is stored in the storage chamber 26, the liquid surface almost coincides with the position of the upper limit display portion 25*a*. The outlet portion 22 is located at a position higher than the upper limit display portion 25*a*. Therefore, even if a maximum amount of ink is stored in the storage chamber 26, the ink never leaks from the outlet portion 22.

The buffer chambers 29*a* to 29*e* are defined by the main body 41 and the sealing member 43. The main body 41 includes peripheral wall portions opening to the right side portion, which individually form the buffer chambers 29*a* to 29*e*. When the opening is sealed by the sealing member 43, the buffer chambers 29*a* to 29*e* are formed.

Figure 9B:
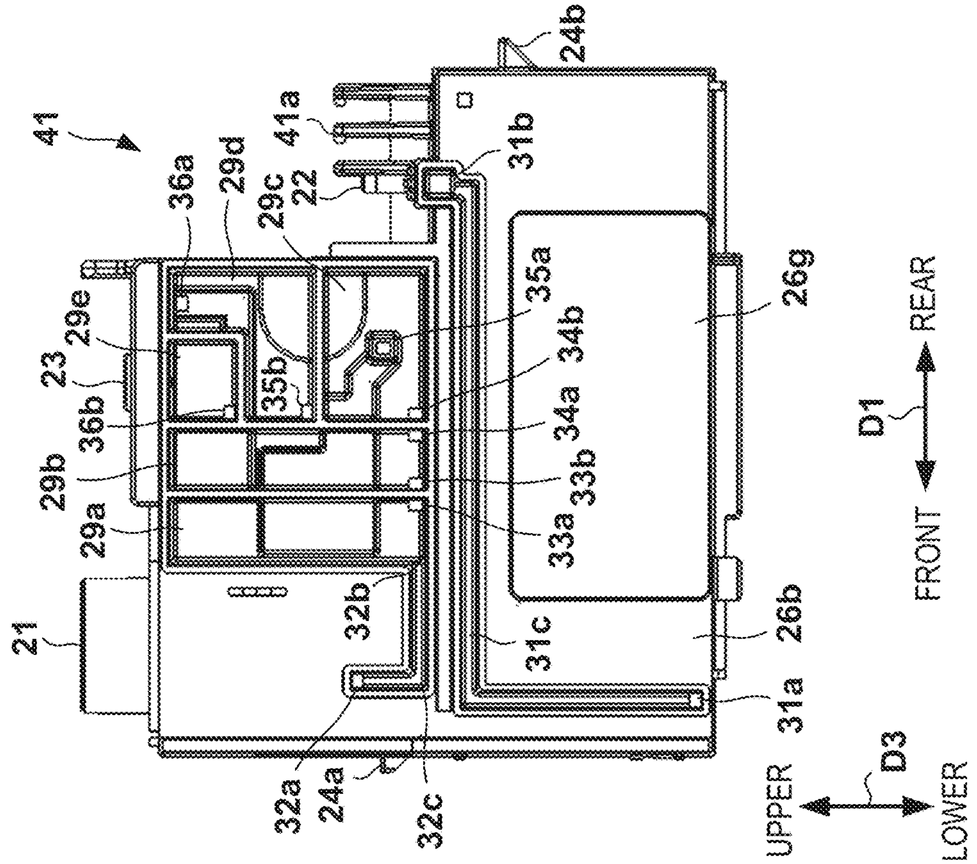
FIGS. 9A and 9B are a right side view and a left side view of the main body of the liquid storing container.
Figure 9A:
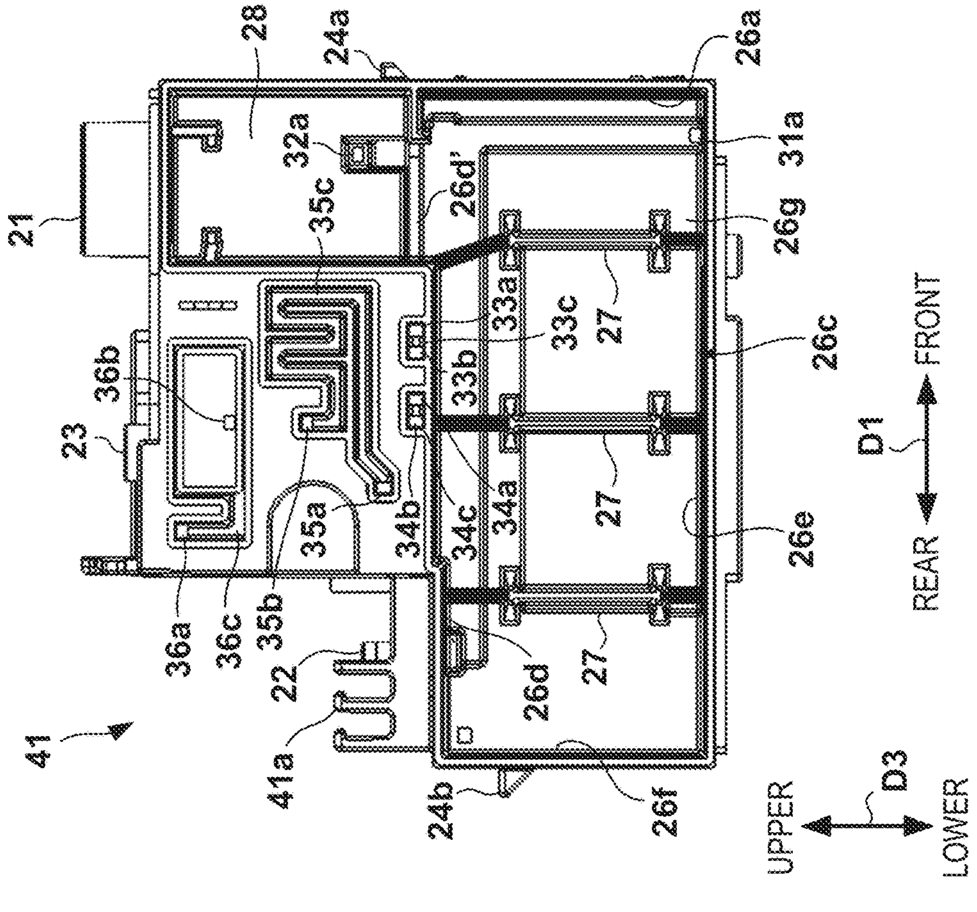

Channels provided in the liquid storing container 6Y will be described with reference to FIGS. 9A and 9B in addition to FIGS. 8A and 8B.

A channel 31 is a channel that makes the storage chamber 26 and the outlet portion 22 communicate with each other. The channel 31 is formed in the right side portion 6*c* of the liquid storing container 6Y. More specifically, the channel 31 is defined by a groove 31*c* formed in the peripheral wall portion (right wall portion 26*b*) of the main body 41 and the sealing member 43 that seals the groove 31*c*. The channel 31 includes a portion extended in the D3 direction and a portion extended in the D1 direction, and thus has an L shape as a whole. One end 31*a* of the channel 31 is an end on the side of the storage chamber 26, and penetrates the lower portion in the front portion of the peripheral wall portion (right wall portion 26*b*) to open to the storage chamber 26. The other end 31*b* of the channel 31 is an end on the side of the outlet portion 22, and communicates with the outlet portion 22.

A channel 32 is a channel that makes the injection path 28 and the buffer chamber 29*a* communicate with each other. The channel 32 is formed in the right side portion 6*c* of the liquid storing container 6Y. More specifically, the channel 32 is defined by a groove 32*c* formed in the main body 41 and the sealing member 43 that seals the groove 32*c*. One end 32*a* of the channel 32 is an end on the side of the injection path 28, and opens to the injection path 28. The end 32*a* is formed in a protruding portion that protrudes from the right wall portion of the injection path 28 to the left side. The other end 32*b* of the channel 32 is an end on the side of the buffer chamber 29*a*, and opens to the buffer chamber 29*a*.

A channel 33 is a channel that makes the buffer chambers 29*a* and 29*b* communicate with each other. The channel 33 is formed in the left side portion 6*b* of the liquid storing container 6Y. More specifically, the channel 33 is defined by a groove 33*c* formed in the main body 41 and the sealing member 42 that seals the groove 33*c*. One end 33*a* of the channel 33 is an end on the side of the buffer chamber 29*a*, and opens to the buffer chamber 29*a*. The other end 33*b* of the channel 33 is an end on the side of the buffer chamber 29*b*, and opens to the buffer chamber 29*b*.

A channel 34 is a channel that makes the buffer chambers 29*b* and 29*c* communicate with each other. The channel 34 is formed in the left side portion 6*b* of the liquid storing container 6Y. More specifically, the channel 34 is defined by a groove 34*c* formed in the main body 41 and the sealing member 42 that seals the groove 34*c*. One end 34*a* of the channel 34 is an end on the side of the buffer chamber 29*b*, and opens to the buffer chamber 29*b*. The other end 34*b* of the channel 34 is an end on the side of the buffer chamber 29*c*, and opens to the buffer chamber 29*c*.

A channel 35 is a channel that makes the buffer chambers 29*c* and 29*d* communicate with each other. The channel 35 is bent and formed in the left side portion 6*b* of the liquid storing container 6Y. More specifically, the channel 35 is defined by a groove 35*c* formed in the main body 41 and the sealing member 42 that seals the groove 35*c*. One end 35*a* of the channel 35 is an end on the side of the buffer chamber 29*c*, and opens to the buffer chamber 29*c*. The end 35*a* is formed in a protruding portion that protrudes from the left wall portion of the buffer chamber 29*c* to the right side. The other end 35*b* of the channel 35 is an end on the side of the buffer chamber 29*d*, and opens to the buffer chamber 29*d*.

A channel 36 is a channel that makes the buffer chambers 29*d* and 29*e* communicate with each other. The channel 36 is formed in the left side portion 6*b* of the liquid storing container 6Y. More specifically, the channel 36 is defined by a groove 36*c* formed in the main body 41 and the sealing member 42 that seals the groove 36*c*. One end 36*a* of the channel 36 is an end on the side of the buffer chamber 29*d*, and opens to the buffer chamber 29*d*. The other end 36*b* of the channel 36 is an end on the side of the buffer chamber 29*e*, and opens to the buffer chamber 29*e*. The buffer chamber 29*e* communicates with the air communicating portion 23.

Note that a gas-liquid separation film may be provided in each of the channels 32 to 36 that make the storage chamber 26 and the air communicating portion 23 communicate with each other. This can reduce leakage of the ink from the air communicating portion 23 to the outside when the ink flows from the storage chamber 26 to the air communicating portion 23.

<Posture of Printing Apparatus>

Figure 10A:
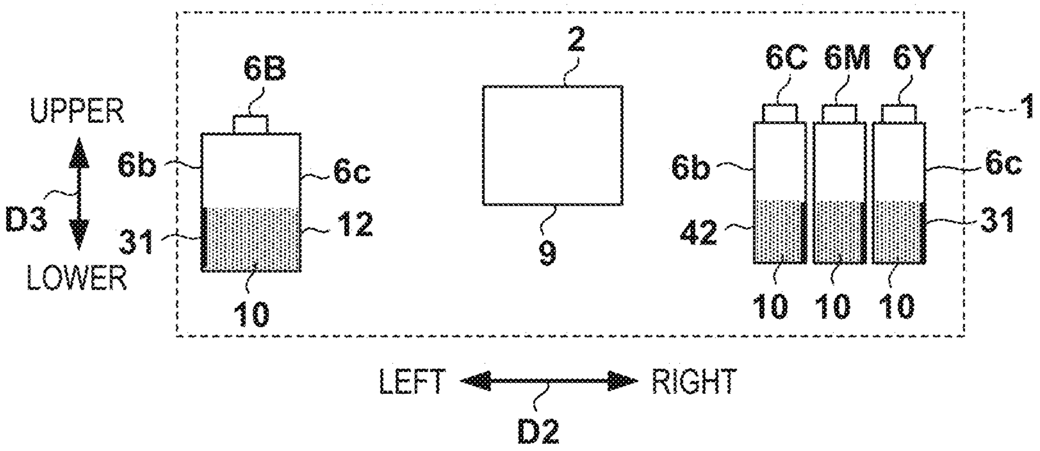
FIGS. 10A to 10C are explanatory views of different postures of the printing apparatus.

A mechanism in which leakage of ink is suppressed when the printing apparatus 1 is set in a posture other than that at the time of use will be described. FIG. 10A schematically shows the arrangement of the liquid storing containers 6 and the carriage 2 (and the printhead 9) when the printing apparatus 1 is in a posture at the time of use. Each liquid storing container 6 stores a maximum amount of ink 10 in the storage chamber 26. When, in this posture, the side of the carriage 2 in the D2 direction is called the inner side and the opposite side is called the outer side, the channel 31 of each liquid storing container 6 is located on the outer side of the liquid storing container 6 and the sealing members 12 and 42 forming the wall portions of the storage chambers 26 are located on the inner side.

Since the sealing members 12 and 42 form the wall portions of the storage chambers 26, damage to the sealing members 12 and 42 directly leads to ink leakage. The sealing members 12 and 42 according to this embodiment are films and thus are readily damaged. If the sealing member 12 or 42 is located on the outer side of the liquid storing containers 6, when mounting the liquid storing container 6B or 6Y, it may contact the internal wall surface of the housing 101 or its peripheral component, thereby damaging the sealing member 12 or 42. At the time of use, the sealing members 12 and 42 may contact foreign substances via the window portions 108 and 109. In this embodiment, since the sealing members 12 and 42 are arranged on the inner side of the liquid storing containers 6, it is possible to improve the protection performances of the sealing members 12 and 42, and structurally suppress damage to them.

The fact that the channel 31 is located on the outer side of the liquid storing container 6 distributes to ink leakage suppression when the printing apparatus 1 is set in a posture other than that at the time of use. Ink leakage suppression when changing from the posture (a maximum amount of ink) shown in FIG. 10A at the time of use to another posture will be described for each posture of the printing apparatus 1.

A case in which the carriage 2 is located at the home position will be described. The carriage 2 is controlled to stop at the home position when the operation of the printing apparatus 1 normally ends.

Figure 10B:
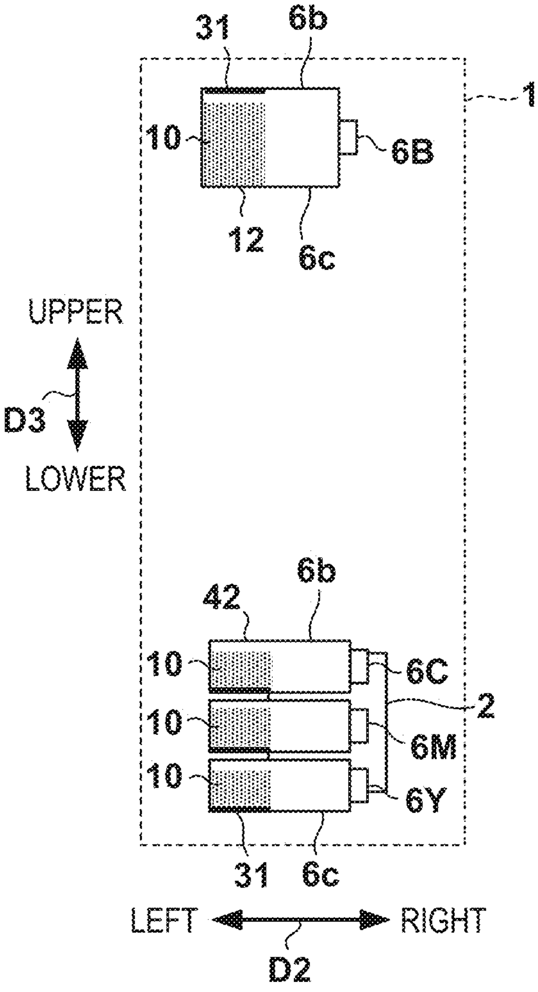

FIG. 10B shows an example of a posture in which the right side portion of the printing apparatus 1 is set on the lower side and the left side portion of the printing apparatus 1 is set on the upper side. In this posture, the liquid storing container 6B is located on the upper side and the liquid storing containers 6C, 6M, and 6Y and the carriage 2 are located on the lower side.

In this posture, the difference between the height of the liquid storing containers 6C, 6M, and 6Y and that of the ink discharge surface 9*a* of the printhead 9 is small. Therefore, even if the meniscus on the ink discharge surface 9*a* is broken, the possibility that the ink stored in each of the liquid storing containers 6C, 6M, and 6Y leaks from the ink discharge surface 9*a* is low.

On the other hand, the liquid storing container 6B is located at a position higher than the ink discharge surface 9*a* of the printhead 9. However, the channel 31 of the liquid storing container 6B is located at a position higher than the storage chamber 26. In other words, the one end 31*a* of the channel 31 is located above the ink liquid surface of the storage chamber 26. Therefore, the channel 31 is not filled with the ink in the storage chamber 26, and the ink does not flow from the outlet portion 22 to the outside. As a result, the possibility that the ink stored in the liquid storing container 6B leaks from the ink discharge surface 9*a* is also low.

A case in which the printing apparatus 1 is left in this posture for a long period and the external atmospheric pressure changes will be described. For example, if the external atmospheric pressure increases, as compared with that at the start of leaving, an atmospheric pressure state in which the air flows from the air communicating portion 23 into the liquid storing container 6 is set, and thus no ink leakage occurs. Conversely, if the external atmospheric pressure decreases, as compared with that at the start of leaving (for example, the printing apparatus 1 is transported to a highland or a tropical cyclone comes to a region where the printing apparatus 1 is installed), an atmospheric pressure state in which the ink in the storage chamber 26 moves from the injection path 28 to the buffer chamber 29*a* is set.

In this case, with respect to the liquid storing container 6B, since the channel 32 is formed in the left side portion 6*b*, and located at a position higher than the storage chamber 26 and the injection path 28, the liquid storing container 6B is not filled with the ink. Therefore, the possibility that the ink leaks from the air communicating portion 23 is low.

With respect to each of the liquid storing containers 6C, 6M, and 6Y, since the channel 32 is formed in the right side portion 6*c*, and located at a position lower than the storage chamber 26 and the injection path 28, the liquid storing container can thus be filled with the ink. However, since the end 32*a* of the channel 32 is provided in the protruding portion, no ink flows into the channel 32 unless the liquid level of the ink in the injection path 28 is equal to or higher than the height of the protruding portion. At this stage, the amount of ink flowing into the channel 32 can be reduced. Furthermore, since each of the channels 33 to 36 is formed in the left side portion 6*b*, it is located at a position higher than the storage chamber 26 and the injection path 28. Therefore, no ink flows. Thus, the possibility that the ink leaks from the air communicating portion 23 is also low.

Figure 10C:
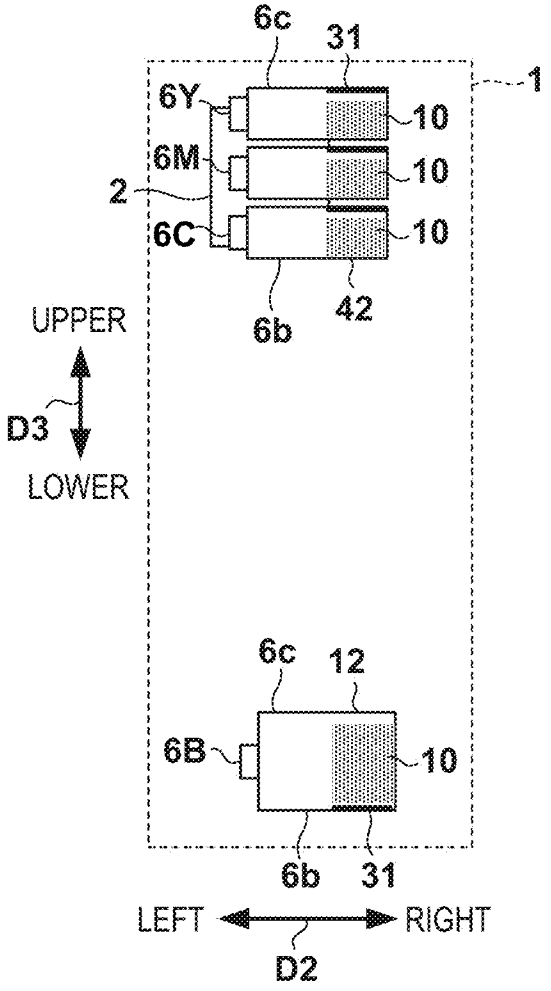

FIG. 10C shows an example of a posture in which the left side portion of the printing apparatus 1 is set on the lower side and the right side portion of the printing apparatus 1 is set on the upper side. In this posture, the liquid storing containers 6C, 6M, and 6Y and the carriage 2 are located on the upper side and the liquid storing container 6B is located on the lower side.

In this posture, the difference between the height of the liquid storing containers 6C, 6M, and 6Y and that of the ink discharge surface 9*a* of the printhead 9 is small. Therefore, even if the meniscus on the ink discharge surface 9*a* is broken, the possibility that the ink stored in each of the liquid storing containers 6C, 6M, and 6Y leaks from the ink discharge surface 9*a* is low. In addition, since the liquid storing container 6B is located at a position lower than the ink discharge surface 9*a* of the printhead 9, the possibility that the ink stored in the liquid storing container 6B leaks from the ink discharge surface 9*a* is also low.

A case in which the printing apparatus 1 is left in this posture for a long period and the external atmospheric pressure changes will be described. For example, if the external atmospheric pressure increases, as compared with that at the start of leaving, an atmospheric pressure state in which the air flows from the air communicating portion 23 into the liquid storing container 6 is set, and thus no ink leakage occurs. If the external atmospheric pressure decreases, as compared with that at the start of leaving, an atmospheric pressure state in which the ink in the storage chamber 26 moves from the injection path 28 to the buffer chamber 29*a* is set.

In this case, with respect to each of the liquid storing containers 6C, 6M, and 6Y, since the channel 32 is formed in the right side portion 6*c*, and located at a position higher than the storage chamber 26 and the injection path 28, the liquid storing container is not filled with the ink. Therefore, the possibility that the ink leaks from the air communicating portion 23 is low.

With respect to the liquid storing container 6B, the channel 32 is formed in the left side portion 6*b*, and located at a position lower than the storage chamber 26 and the injection path 28, the liquid storing container 6B can be filled with the ink. However, since the end 32*a* of the channel 32 is provided in the protruding portion, no ink flows into the channel 32 unless the liquid level of the ink in the injection path 28 is equal to or higher than the height of the protruding portion. At this stage, the amount of ink flowing into the channel 32 can be reduced. Furthermore, since each of the channels 33 to 36 is formed in the right side portion 6*c*, it is located at a position higher than the storage chamber 26 and the injection path 28. Therefore, no ink flows. Thus, the possibility that the ink leaks from the air communicating portion 23 is also low.

Figure 11A:
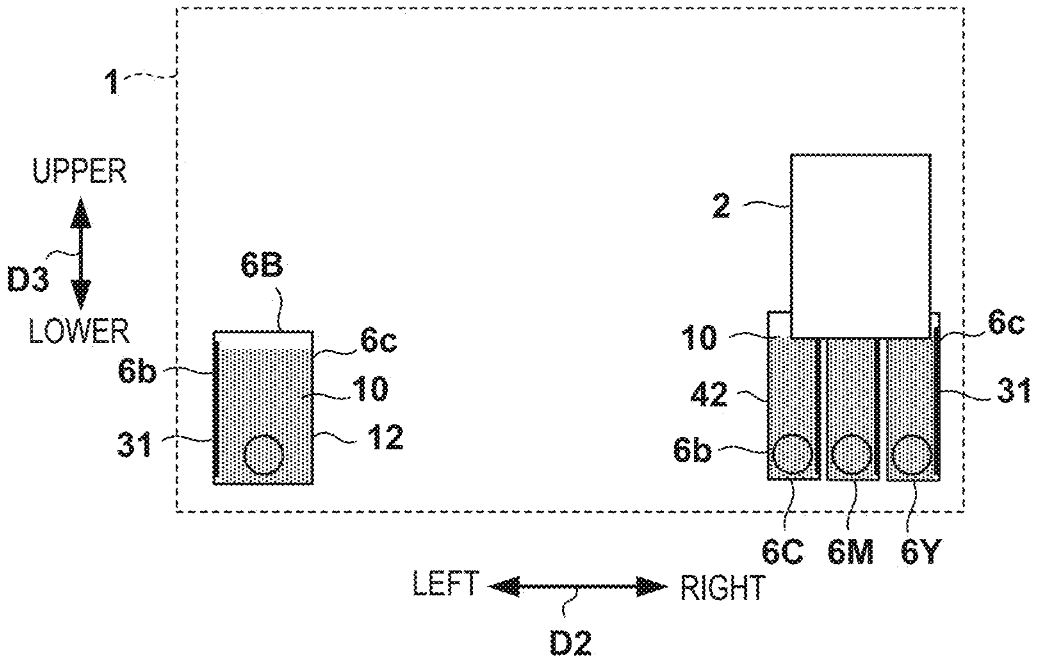
FIGS. 11A and 11B are explanatory views of different postures of the printing apparatus.

FIG. 11A exemplifies a posture in which the front portion of the printing apparatus 1 is set on the lower side and the rear portion of the printing apparatus 1 is set on the upper side. In this posture, the carriage 2 is located on the upper side and the liquid storing containers 6 are located on the lower side. Since the ink discharge surface 9*a* of the printhead 9 is located at a position higher than the liquid storing containers 6, even if the meniscus on the ink discharge surface 9*a* is broken, the possibility that the ink stored in each liquid storing container 6 leaks from the ink discharge surface 9*a* is low. In addition, the outlet portion 22 is located at a position higher than the liquid surface of the ink stored in the storage chamber 26, and thus no ink flows from the outlet portion 22.

A case in which the printing apparatus 1 is left in this posture for a long period and the external atmospheric pressure changes will be described. For example, if the external atmospheric pressure increases, as compared with that at the start of leaving, an atmospheric pressure state in which the air flows from the air communicating portion 23 into the liquid storing container 6 is set, and thus no ink leakage occurs. If the external atmospheric pressure decreases, as compared with that at the start of leaving, an atmospheric pressure state in which the ink in the storage chamber 26 moves from the injection path 28 to the buffer chamber 29*a* is set.

However, since the end 32*a* of the channel 32 is located at a position higher than the front side portion 6*a* of the liquid storing container 6, no ink flows into the channel 32 unless the liquid level of the ink in the injection path 28 is equal to or higher than the height of the end 32*a*. At this stage, the amount of ink flowing into the channel 32 can be reduced. Furthermore, the buffer chambers 29*a* to 29*e* and the channels 33 to 36 are located at positions higher than the injection path 28. Since the liquid level does not rise by the flow of the ink into some of these spaces, the possibility that the ink leaks from the air communicating portion 23 is also low.

Figure 11B:
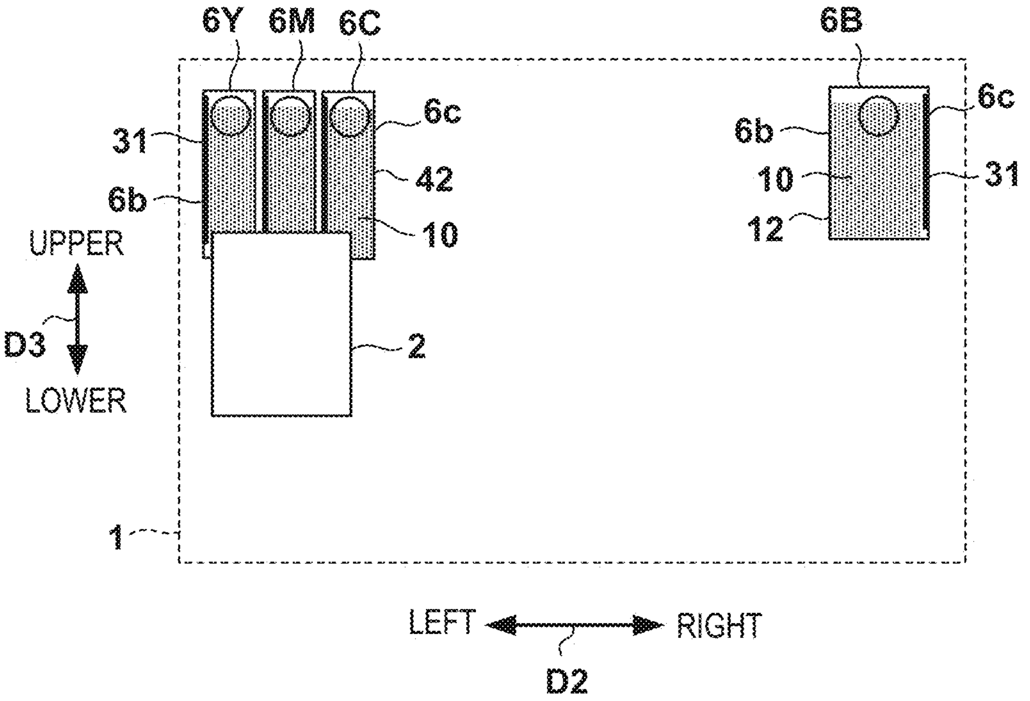

FIG. 11B exemplifies a posture in which the front portion of the printing apparatus 1 is set on the upper side and the rear portion of the printing apparatus 1 is set on the lower side. In this posture, the liquid storing containers 6 are located on the upper side and the carriage 2 is located on the lower side. Since, however, the end 31*a* of the channel 31 is located at a high position in the storage chamber 26, the possibility that the ink in the storage chamber 26 flows to the channel 31 is low. In other words, the end 31*a* of the channel 31 is located above the liquid surface of the ink in the storage chamber 26.

A case in which the printing apparatus 1 is left in this posture for a long period and the external atmospheric pressure changes will be described. For example, if the external atmospheric pressure increases, as compared with that at the start of leaving, an atmospheric pressure state in which the air flows from the air communicating portion 23 into the liquid storing container 6 is set, and thus no ink leakage occurs. If the external atmospheric pressure decreases, as compared with that at the start of leaving, an atmospheric pressure state in which the ink in the storage chamber 26 moves from the injection path 28 to the buffer chamber 29*a* is set.

However, since the injection path 28 and the end 32*a* of the channel 32 are located at high positions, the possibility that the ink in the storage chamber 26 flows into the injection path 28 and the channel 32 is low. Therefore, the possibility that the ink leaks from the air communicating portion 23 is also low.

Figure 14A:
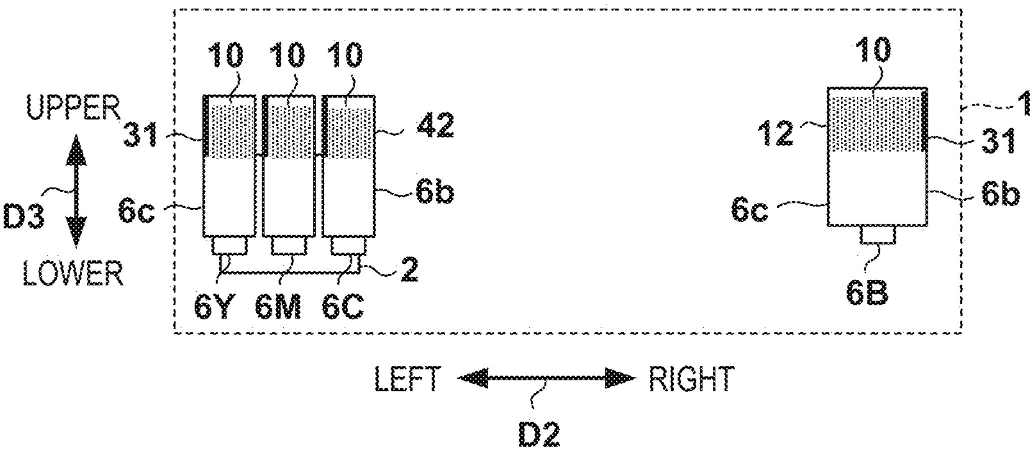
FIGS. 14A and 14B are explanatory views of different postures of the printing apparatus.

FIG. 14A exemplifies a posture in which the printing apparatus 1 is turned upside down. In this posture, since the difference between the height of the liquid storing containers 6 and that of the ink discharge surface 9*a* of the printhead 9 is small, even if the meniscus on the ink discharge surface 9*a* is broken, the possibility that the ink stored in each liquid storing container 6 leaks from the ink discharge surface 9*a* is low. Furthermore, since the end 31*a* of the channel 31 is located at a high position in the storage chamber 26, the channel 31 is not filled with the ink in the storage chamber 26, and no ink flows from the outlet portion 22 to the outside. From this point as well, the possibility that the ink stored in each liquid storing container 6 leaks from the ink discharge surface 9*a* is low.

A case in which the printing apparatus 1 is left in this posture for a long period and the external atmospheric pressure changes will be described. For example, if the external atmospheric pressure increases, as compared with that at the start of leaving, an atmospheric pressure state in which the air flows from the air communicating portion 23 into the liquid storing container 6 is set, and thus no ink leakage occurs. If the external atmospheric pressure decreases, as compared with that at the start of leaving, an atmospheric pressure state in which the ink in the storage chamber 26 moves from the injection path 28 to the buffer chamber 29*a* is set.

Since the ink in the storage chamber 26 flows into the injection path 28 but the end 32*a* of the channel 32 is located at a high position away from the top portion 6*d* of the liquid storing container 6, no ink flows into the channel 32 unless the liquid level of the ink in the injection path 28 is equal to or higher than the end 32*a*. At this stage, the amount of ink flowing into the channel 32 can be reduced. Furthermore, the ends 33*a* to 35*a* of the channels 33 to 35 are also located at high positions in the buffer chambers 29*a* to 29*c*. Since the liquid level does not rise by the flow of the ink into some spaces of the buffer chambers 29*a* to 29*c*, the possibility that the ink leaks from the air communicating portion 23 is also low.

A case in which the carriage 2 is located at the end (the position shown in FIG. 4B) on the opposite side of the home position within the moving range and the meniscus of the nozzles on the ink discharge surface 9*a* is broken will be described next. As described above, the carriage 2 is normally located at the home position but a state in which the carriage 2 stops at a position other than the home position when the operation of the printing apparatus 1 abnormally ends or a power failure occurs can be set. In this state, the ink discharge surface 9*a* is not covered with the cap 4*a*, thereby increasing the possibility that the meniscus of the nozzles on the ink discharge surface 9*a* is broken.

Figure 12A:
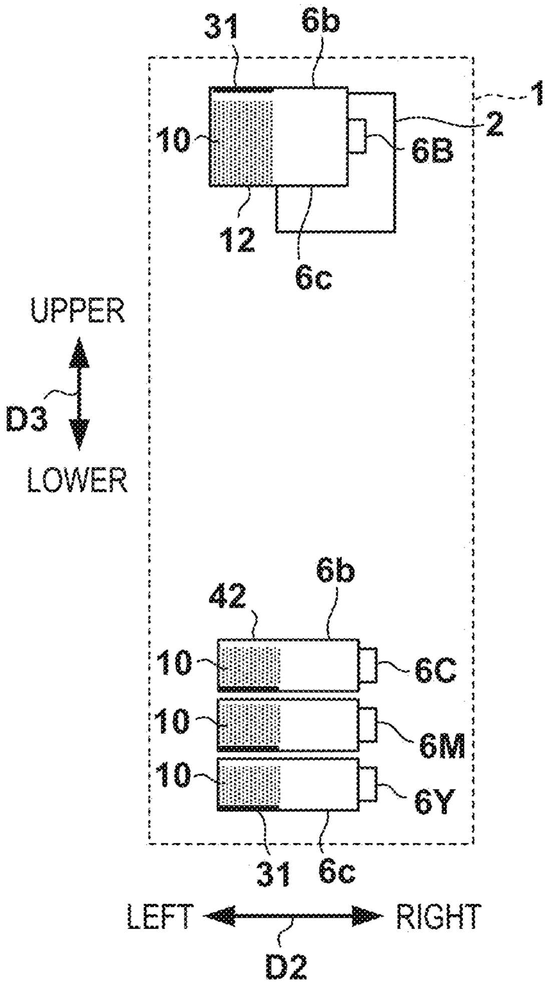
FIGS. 12A and 12B are explanatory views of different postures of the printing apparatus.

FIG. 12A shows an example of a posture in which the right side portion of the printing apparatus 1 is set on the lower side and the left side portion of the printing apparatus 1 is set on the upper side. In this posture, the liquid storing container 6B and the carriage 2 are located on the upper side, and the liquid storing containers 6C, 6M, and 6Y are located on the lower side.

In this posture, since the difference between the height of the liquid storing container 6B and that of the ink discharge surface 9*a* of the printhead 9 is small, the possibility that the ink stored in the liquid storing container 6B leaks from the ink discharge surface 9*a* is low. Furthermore, since the liquid storing containers 6C, 6M, and 6Y are located at positions lower than the printhead 9, the possibility that the ink stored in each of the liquid storing containers 6C, 6M, and 6Y leaks from the ink discharge surface 9*a* is low.

A case in which the printing apparatus 1 is left in this posture for a long period and the external atmospheric pressure changes will be described. For example, if the external atmospheric pressure increases, as compared with that at the start of leaving, an atmospheric pressure state in which the air flows from the air communicating portion 23 into the liquid storing container 6 is set, and thus no ink leakage occurs. Conversely, if the external atmospheric pressure decreases, as compared with that at the start of leaving, an atmospheric pressure state in which the ink in the storage chamber 26 moves from the injection path 28 to the buffer chamber 29*a* is set. In this case, for the same reason as that described with reference to the example shown in FIG. 10B, the possibility that the ink in each liquid storing container 6 leaks from the air communicating portion 23 is low.

Figure 12B:
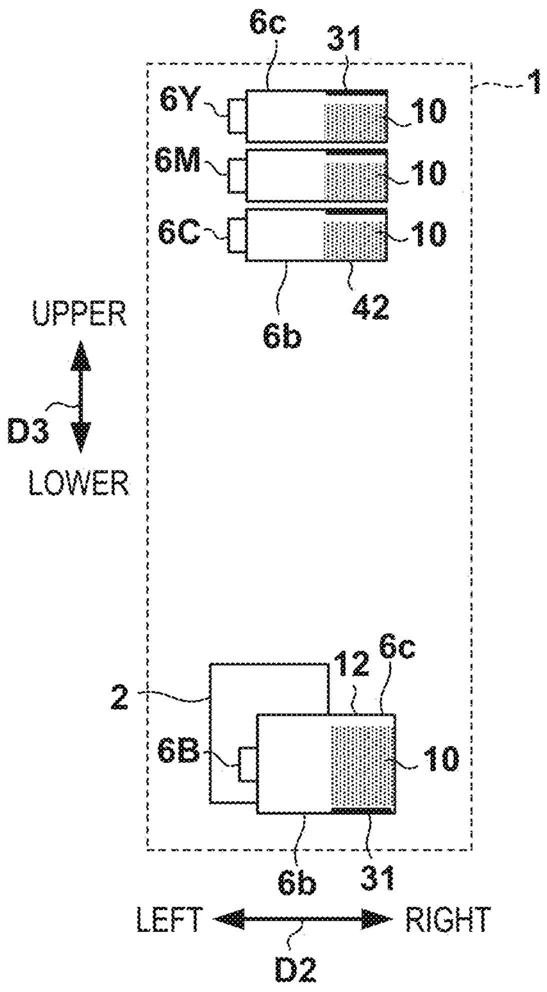

FIG. 12B shows an example of a posture in which the left side portion of the printing apparatus 1 is set on the lower side and the right side portion of the printing apparatus 1 is set on the upper side. In this posture, the liquid storing containers 6C, 6M, and 6Y are located on the upper side and the liquid storing container 6B and the carriage 2 are located on the lower side.

In this posture, since the difference between the height of the liquid storing container 6B and that of the ink discharge surface 9*a* of the printhead 9 is small, the possibility that the ink stored in the liquid storing container 6B leaks from the ink discharge surface 9*a* is low.

On the other hand, the liquid storing containers 6C, 6M, and 6Y are located at positions higher than the ink discharge surface 9*a* of the printhead 9. However, each of the channels 31 of the liquid storing containers 6C, 6M, and 6Y is located at a position higher than the storage chamber 26. In other words, the end 31*a* of the channel 31 is located above the liquid surface of the ink in the storage chamber 26. Therefore, the channel 31 is not filled with the ink in the storage chamber 26 and no ink flows from the outlet portion 22 to the outside. As a result, the possibility that the ink stored in each of the liquid storing containers 6C, 6M, and 6Y leaks from the ink discharge surface 9*a* is also low.

A case in which the printing apparatus 1 is left in this posture for a long period and the external atmospheric pressure changes will be described. For example, if the external atmospheric pressure increases, as compared with that at the start of leaving, an atmospheric pressure state in which the air flows from the air communicating portion 23 into the liquid storing container 6 is set, and thus no ink leakage occurs. Conversely, if the external atmospheric pressure decreases, as compared with that at the start of leaving, an atmospheric pressure state in which the ink in the storage chamber 26 moves from the injection path 28 to the buffer chamber 29*a* is set. In this case, for the same reason as that described with reference to the example shown in FIG. 10C, the possibility that the ink in each liquid storing container 6 leaks from the air communicating portion 23 is low.

Figure 13A:
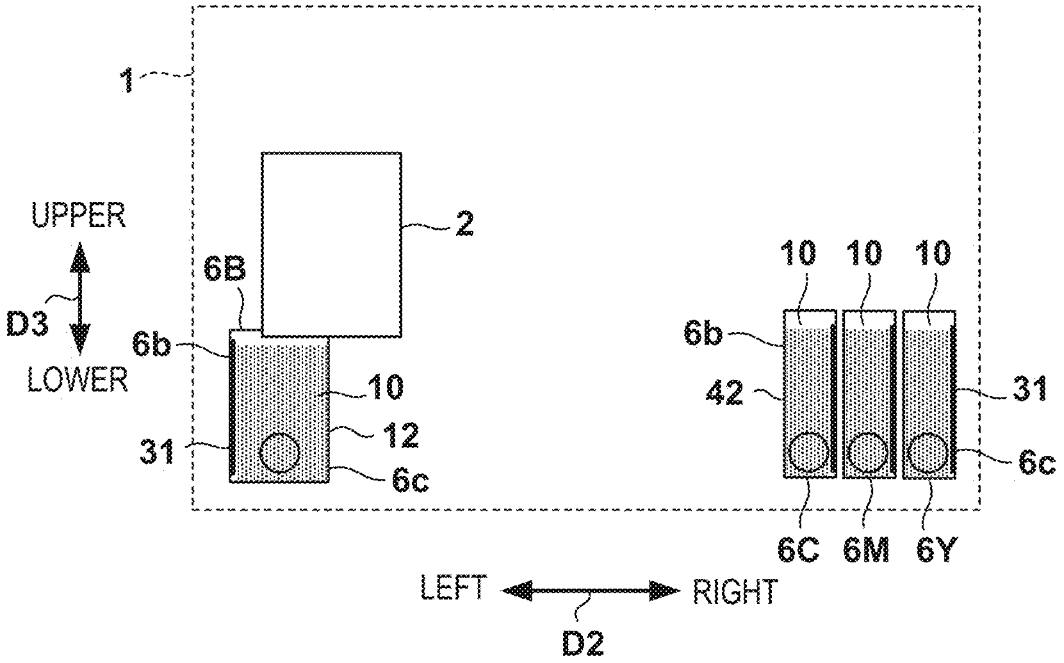
FIGS. 13A and 13B are explanatory views of different postures of the printing apparatus.

FIG. 13A exemplifies a posture in which the front portion of the printing apparatus 1 is set on the lower side and the rear portion of the printing apparatus 1 is set on the upper side. In this posture, the carriage 2 is located on the upper side and the liquid storing containers 6 are located on the lower side. Since the ink discharge surface 9*a* of the printhead 9 is located at a position higher than the liquid storing containers 6, the possibility that the ink in each liquid storing container 6 leaks from the ink discharge surface 9*a* is low. Furthermore, the outlet portion 22 is located at a position higher than the liquid surface of the ink stored in the storage chamber 26 and no ink flows from the outlet portion 22.

A case in which the printing apparatus 1 is left in this posture for a long period and the external atmospheric pressure changes will be described. For example, if the external atmospheric pressure increases, as compared with that at the start of leaving, an atmospheric pressure state in which the air flows from the air communicating portion 23 into the liquid storing container 6 is set, and thus no ink leakage occurs. Conversely, if the external atmospheric pressure decreases, as compared with that at the start of leaving, an atmospheric pressure state in which the ink in the storage chamber 26 moves from the injection path 28 to the buffer chamber 29*a* is set. In this case, for the same reason as that described with reference to the example shown in FIG. 11A, the possibility that the ink in each liquid storing container 6 leaks from the air communicating portion 23 is low.

Figure 13B:
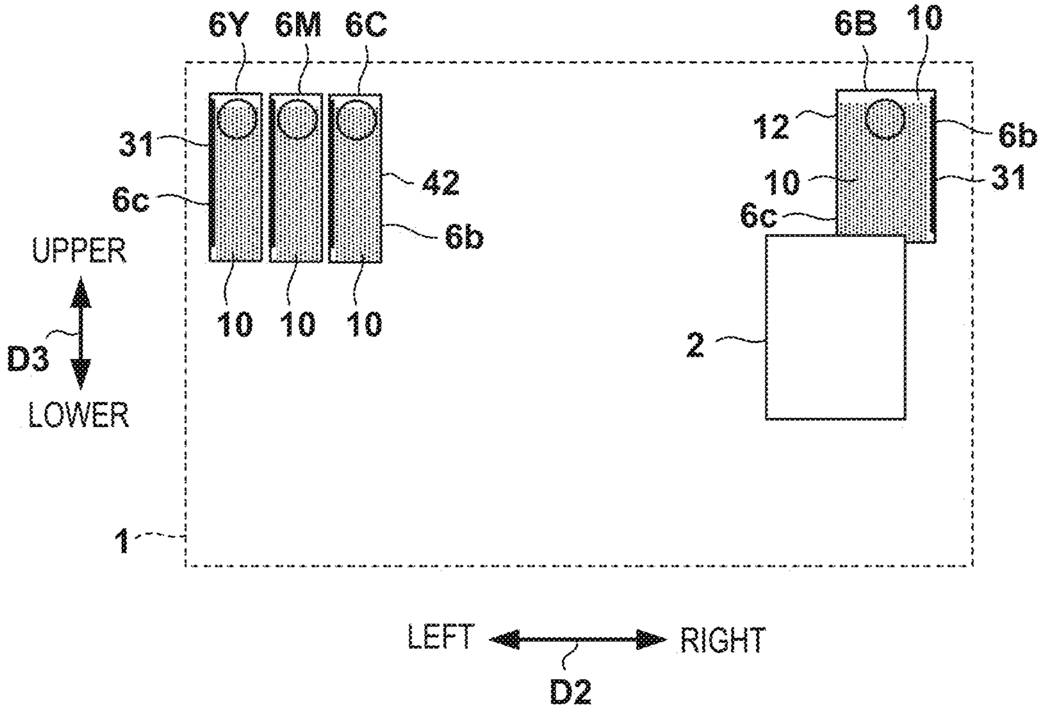

FIG. 13B exemplifies a posture in which the front portion of the printing apparatus 1 is set on the upper side and the rear portion of the printing apparatus 1 is set on the lower side. In this posture, the liquid storing containers 6 are located on the upper side and the carriage 2 is located on the lower side. Since, however, the end 31*a* of the channel 31 is located at a high position in the storage chamber 26, the possibility that the ink in the storage chamber 26 flows into the channel 31 is low. In other words, the end 31*a* of the channel 31 is located above the liquid surface of the ink in the storage chamber 26.

A case in which the printing apparatus 1 is left in this posture for a long period and the external atmospheric pressure changes will be described. For example, if the external atmospheric pressure increases, as compared with that at the start of leaving, an atmospheric pressure state in which the air flows from the air communicating portion 23 into the liquid storing container 6 is set, and thus no ink leakage occurs. Conversely, if the external atmospheric pressure decreases, as compared with that at the start of leaving, an atmospheric pressure state in which the ink in the storage chamber 26 moves from the injection path 28 to the buffer chamber 29*a* is set. In this case, for the same reason as that described with reference to the example shown in FIG. 11B, the possibility that the ink in each liquid storing container 6 leaks from the air communicating portion 23 is low.

Figure 14B:
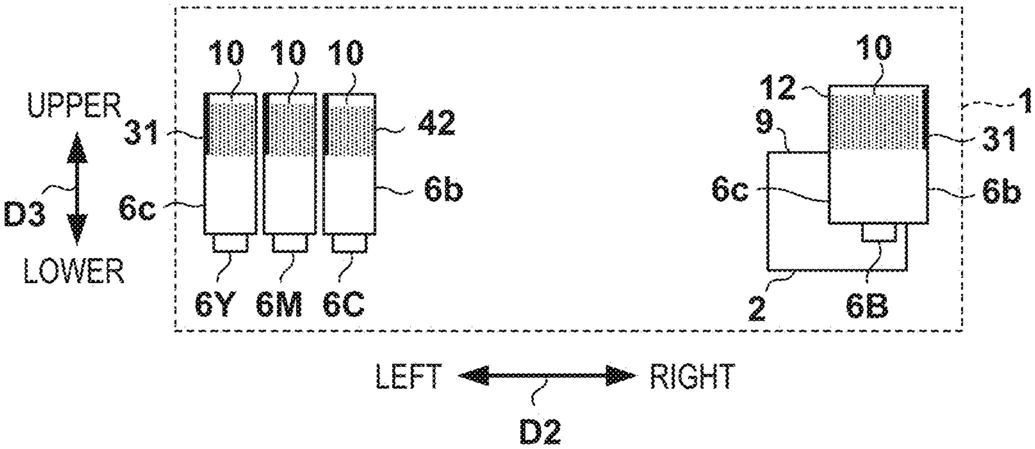

FIG. 14B exemplifies a posture in which the printing apparatus 1 is turned upside down. In this posture, since the difference between the height of the liquid storing containers 6 and that of the ink discharge surface 9*a* of the printhead 9 is small, the possibility that the ink stored in each liquid storing container 6 leaks from the ink discharge surface 9*a* is low. Furthermore, since the end 31*a* of the channel 31 is located at a high position in the storage chamber 26, the channel 31 is not filled with the ink in the storage chamber 26, and no ink flows from the outlet portion 22 to the outside. From this point as well, the possibility that the ink stored in each liquid storing container 6 leaks from the ink discharge surface 9*a* is low.

A case in which the printing apparatus 1 is left in this posture for a long period and the external atmospheric pressure changes will be described. For example, if the external atmospheric pressure increases, as compared with that at the start of leaving, an atmospheric pressure state in which the air flows from the air communicating portion 23 into the liquid storing container 6 is set, and thus no ink leakage occurs. Conversely, if the external atmospheric pressure decreases, as compared with that at the start of leaving, an atmospheric pressure state in which the ink in the storage chamber 26 moves from the injection path 28 to the buffer chamber 29*a* is set. In this case, for the same reason as that described with reference to the example shown in FIG. 14A, the possibility that the ink in each liquid storing container 6 leaks from the air communicating portion 23 is low.

As described above, according to this embodiment, even if the printing apparatus 1 is set in a posture in a direction different from that at the time of use, the possibility of flow-out of the ink can be decreased, and an ink leakage amount can be reduced.

OTHER EMBODIMENTS

The above embodiment has exemplified the example in which the printhead for black ink and the printhead for cyan ink, magenta ink, and yellow ink are provided as the printheads 9. The present invention, however, is not limited to this arrangement, and a printhead for four colors may be used. The number of storage chambers 26 and the number of buffer chambers 29*a* to 29*e* according to the above-described embodiment are merely example, and the present invention is not limited to them.

The above embodiment has exemplified the liquid storing container 6 including the protruding portion 26*g* but the liquid storing container 6 need not include the protruding portion 26*g*. Furthermore, the liquid storing container 6 including the ink visible surface 25 in the front side portion 6*a* has been exemplified. However, the ink visible surface 25 may be formed on another surface such as the left side portion 6*b* or the right side portion 6*c*. The housing 101 including the window portions 104 to 109 has been exemplified but an arrangement without any window portion can be adopted.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-130771, filed Jul. 31, 2020, which is hereby incorporated by reference herein in its entirety.

What is claimed is:

1. A printing apparatus comprising:

a carriage configured to move, and on which a first print head for ejecting color ink and a second print head for ejecting black ink are mounted; and a storing container including:

a first storage chamber configured to store the color ink to be supplied to the first print head, the first storage chamber having an opening, sealed by a sealing member, on a first side of the storing container;

an injection port, detachably capped by a cap, configured to allow the color ink to be injected into the first storage chamber;

a second storage chamber configured to store air therein, and to be communicated with an external air in a state where the injection port is capped by the cap;

an upper limit indicator that indicates an upper limit of an amount of the color ink stored in the first storage chamber;

a communication port configured to communicate with the first storage chamber and the second storage chamber, the communication port being located at a position higher than the upper limit indicator in a case where the printing apparatus is in a posture in use; and a groove configured to form a channel in which the color ink flows, the groove being formed on a second side, opposite to the first side, of the storing container.

2. The printing apparatus according to claim 1, wherein the storing container includes a lower limit indicator that indicates a lower limit of an amount of the color ink stored in the first storage chamber.

3. The printing apparatus according to claim 1, wherein the color ink flows in the channel toward the first print head.

4. The printing apparatus according to claim 1, further comprising a tube configured to connect the first print head and the storing container, the tube being connected to an outlet portion of the storing container.

5. The printing apparatus according to claim 1, wherein the first storage chamber is configured to communicate with the external air through the communication port.

6. The printing apparatus according to claim 1, further comprising a tank cover configured to cover the injection port.

7. The printing apparatus according to claim 1, wherein the injection port is formed on a top portion of the storing container.

8. The printing apparatus according to claim 7, wherein a second groove is formed on the top portion and formed adjacent to the injection port.

9. The printing apparatus according to claim 1, further comprising a conveying roller configured to convey a print medium in a first direction, the storing container is provided downstream of the first print head in the first direction.

10. The printing apparatus according to claim 1, wherein the groove is not sealed by the sealing member.

11. A printing apparatus comprising:

a carriage configured to move, and on which a first print head for ejecting color ink and a second print head for ejecting black ink are mounted; and a storing container including:

a first storage chamber configured to store the color ink to be supplied to the first print head, the first storage chamber having an opening, sealed by a sealing member, on a first side of the storing container;

an injection port, detachably capped by a cap, configured to allow the color ink to be injected into the first storage chamber;

a second storage chamber configured to store air therein, and to be communicated with an external air in a state where the injection port is capped by the cap;

a communication port configured to communicate with the first storage chamber and the second storage chamber, the communication port being located at a position higher than a liquid surface of the color ink of a maximum amount in the first storage chamber in a state where the printing apparatus is in a posture in use; and a groove configured to form a channel in which the color ink flows, the groove being formed on a second side, opposite to the first side, of the storing container.

12. The printing apparatus according to claim 11, wherein the color ink flows in the channel toward the first print head.

13. The printing apparatus according to claim 11, further comprising a tube configured to connect the first print head and the storing container, the tube being connected to an outlet portion of the storing container.

14. The printing apparatus according to claim 11, wherein the first storage chamber is configured to communicate with the external air through the communication port.

15. The printing apparatus according to claim 11, further comprising a tank cover configured to cover the injection port.

16. The printing apparatus according to claim 11, wherein the injection port is formed on a top portion of the storing container.

17. The printing apparatus according to claim 16, wherein a second groove is formed on the top portion and formed adjacent to the injection port.

18. The printing apparatus according to claim 11, further comprising a conveying roller configured to convey a print medium in a first direction, the storing container is provided downstream of the first print head in the first direction.

19. The printing apparatus according to claim 11, wherein the groove is not sealed by the sealing member.

* * * * *